Sept. 20, 1960 C. F. ZAHNER 2,953,642
AUTOMATIC DIGITAL SIGNAL KEYER
Filed Feb. 3, 1958 6 Sheets-Sheet 1

INVENTOR
CHARLES F. ZAHNER
BY Norbert Ederer
HIS ATTORNEY

AUTOMATIC DIGITAL SIGNAL KEYER

Filed Feb. 3, 1958 6 Sheets-Sheet 2

INVENTOR
CHARLES F. ZAHNER
BY Norbert Ederer
HIS ATTORNEY

Sept. 20, 1960 C. F. ZAHNER 2,953,642

AUTOMATIC DIGITAL SIGNAL KEYER

Filed Feb. 3, 1958 6 Sheets-Sheet 3

Inventor
CHARLES F. ZAHNER

By Norbert Ederer

HIS ATTORNEY

Sept. 20, 1960 C. F. ZAHNER 2,953,642

AUTOMATIC DIGITAL SIGNAL KEYER

Filed Feb. 3, 1958 6 Sheets-Sheet 4

INVENTOR
CHARLES F. ZAHNER
BY Norbert Eslerer
HIS ATTORNEY

Sept. 20, 1960 C. F. ZAHNER 2,953,642

AUTOMATIC DIGITAL SIGNAL KEYER

Filed Feb. 3, 1958 6 Sheets-Sheet 5

INVENTOR
CHARLES F. ZAHNER
BY Norbert Ederer
ATTORNEY

Sept. 20, 1960 C. F. ZAHNER 2,953,642

AUTOMATIC DIGITAL SIGNAL KEYER

Filed Feb. 3, 1958 6 Sheets-Sheet 6

INVENTOR.
CHARLES F. ZAHNER

BY Norbert Ederer

HIS ATTORNEY

United States Patent Office 2,953,642

Patented Sept. 20, 1960

2,953,642

AUTOMATIC DIGITAL SIGNAL KEYER

Charles F. Zahner, Clifton, N.J., assignor to Curtiss-Wright Corporation, a corporation of Delaware Filed Feb. 3, 1958, Ser. No. 713,005

20 Claims. (Cl. 178—79)

This invention relates to simulated radio navigational aids in aircraft trainers and more particularly to keying apparatus for keying the simulated radio transmitter signal with the identification call-letters of the simulated radio station.

The present invention is directed to improvements in automatic electronic keying equipment of the kind disclosed in a copending application of mine, Theodore S. Spitz and Ralph L. Samson, Serial No. 685,492, filed September 23, 1957.

Various types of radio navigational aid systems are employed in actual air traffic and have been incorporated in flight simulating apparatus for the training of student pilots. Such systems include the very high frequency omni-range (VOR) system and the instrument landing system (ILS), either of which may be provided to transmit distance measuring equipment (DME) aid to the pilot. Additionally the low frequency AN range transmission system has been employed for navigational aid purposes. These systems generally employ radio transmission of aural or visual navigation aid signals to the pilot. From time to time the transmission may be interrupted and the station is identified by transmission of its identification call-letters. Station identification signals are transmitted regularly in the form of a 1020 c.p.s. audio tone keyed on and off in accordance with the Morse Code representation of the call-letters.

Generally a station-identification call-letter sequence is composed of two or three call-letters. In the case of marker or beacon (MARK) transmission one letter sequences may be employed. Four letter sequences presently are employed only in some European countries. In the United States four-letter sequences are employed at present for the limited purpose of ILS transmission wherein the letter I is transmitted in Morse Code preceding the regular sequence of station-identification call-letters. The keyer hereinafter described includes means to produce sequences of from one to four letters, allowing for future use of four letter sequences in the United States as well as permitting present use in European countries. The keyer is also equipped to transmit ILS signals. In such case the interval of silence, which begins at the end of the second dot of the letter I and ends with the beginning of the initial letter in the station-identification sequence proper, is of five units of time in duration instead of the usual three units of time separating the letters in the sequence.

The keyer is also equipped to simulate operation of a radio station transmitting DME aid signals, in which case a continuous 1020 c.p.s. audio tone is transmitted intermediate of short silence intervals following the termination of one sequence of call-letters and preceding the next such sequence.

It is a principal object of the invention to provide an improved universal keyer which is settable to generate call-letters sequences including from one to four letters inclusive according to any desired combination of call-letters.

Another object of the invention is to provide an all-purpose electronic keyer capable of generating the station-identification and other aid signals for VOR, ILS, DME, MARK and AN range operation.

Still another object of the invention is to provide an electronic keyer utilizing digital techniques and standardized circuits, particularly commercially available packaged plug-in circuits for purposes of ready replacement and interchangeability.

For purposes of the invention the Morse Code letters are grouped into intelligence characters and space characters. The former include dots and dashes whereas the latter include short spaces separating the intelligence characters within a letter and the long spaces which separate the letters from one another. The basic unit of time are the equal durations of a dot or a short space, approximately 0.1 second. The dashes and long spaces have a duration of three units of time. As is well-known, Morse Code letters are composed of from one to four intelligence characters. For purposes of the invention the letters may also be regarded as composed of character counts. Each letter is composed of a number of character counts equal to the number of its intelligence characters plus two. The intelligence character counts commence coinitially with the corresponding intelligence characters but terminate one unit of time thereafter.

Thus the counts generally embrace the period of the associated intelligence characters and the short spaces thereafter. This definition is not strictly applicable to the last of the intelligence character counts which is followed by a long space three units of time in duration, and therefore the previous definition of duration of the corresponding intelligence character plus one unit of time must be applied thereto. The remainder of the time allocation for a given letter is allotted to a long space count and a reset count each of a duration of one unit of time. The long space count commences at the termination of the last intelligence character count. The reset count occupies the time interval from the termination of the long space count to the first count of the next letter. Thus a given letter for purposes of the invention is regarded as commencing with the beginning of its initial intelligence character and terminating with the end of the inter-letter long space following its last intelligence character. In certain instances hereinafter the reset count is alternatively regarded as allocated to the next letter and therefore constitutes the count 0 of such next letter rather than the last count of the preceding letter. This will be apparent from the context.

In order that the detailed nature of the invention may be clearly understood, reference is made to the following description considered together with the accompanying drawings in which Fig. 1 is a simplified block diagram of the automatic electronic keyer in accordance with a preferred embodiment of the invention;

Figure 1:
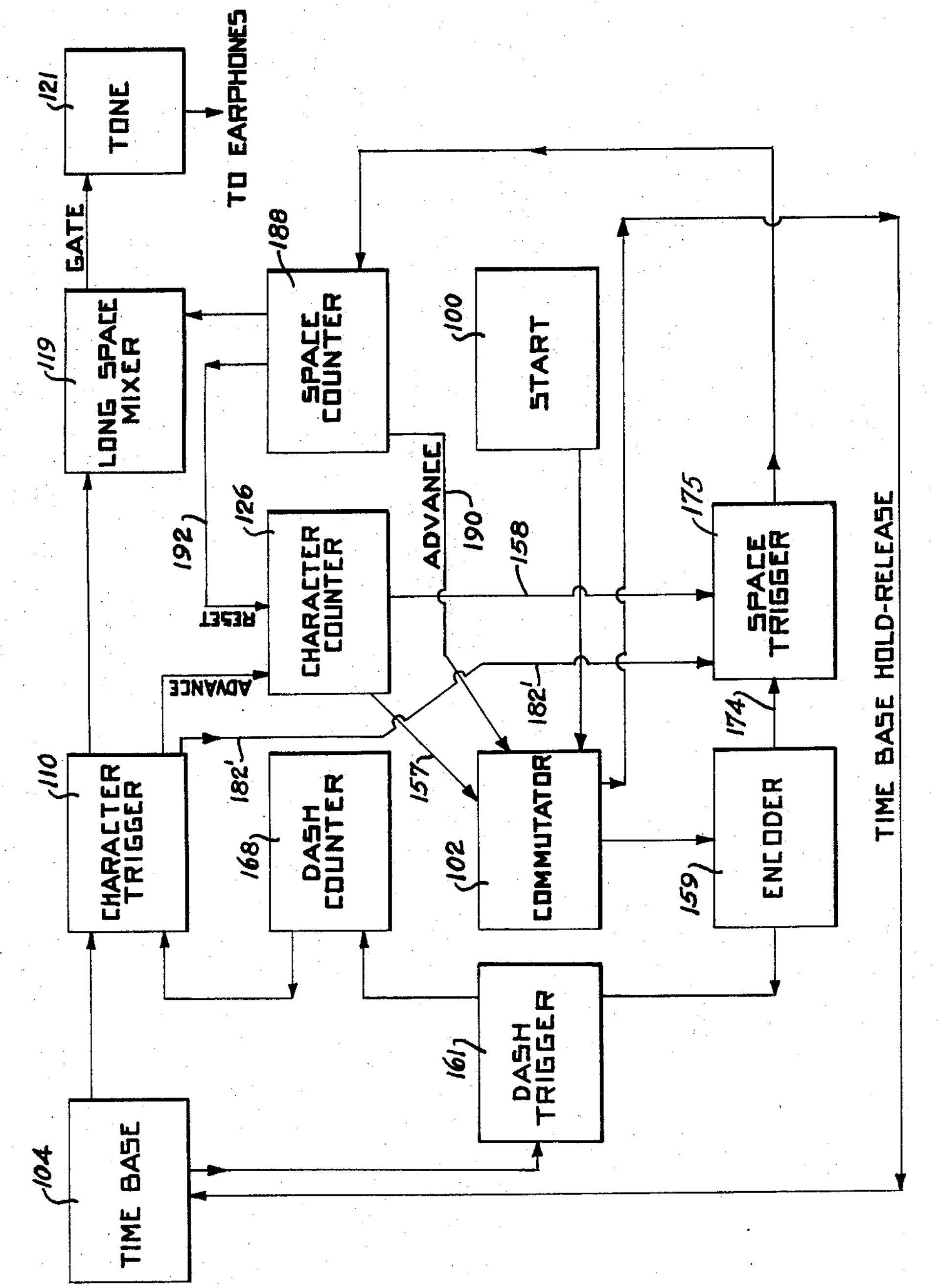
Figure 2:
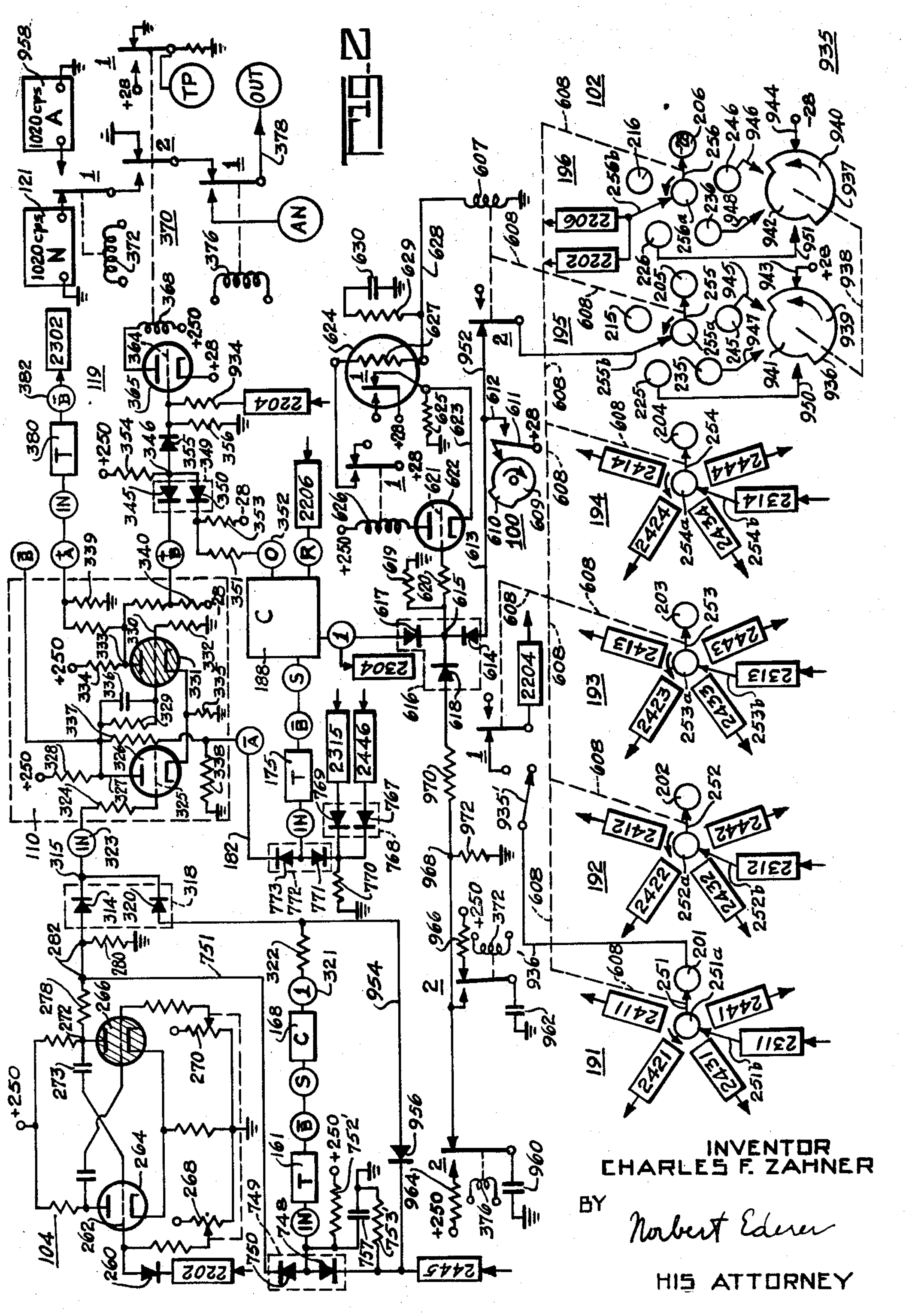
Fig. 2 is a schematic drawing of the apparatus indicated in Fig. 1 excepting the character counter and encoder units.
Figure 3:
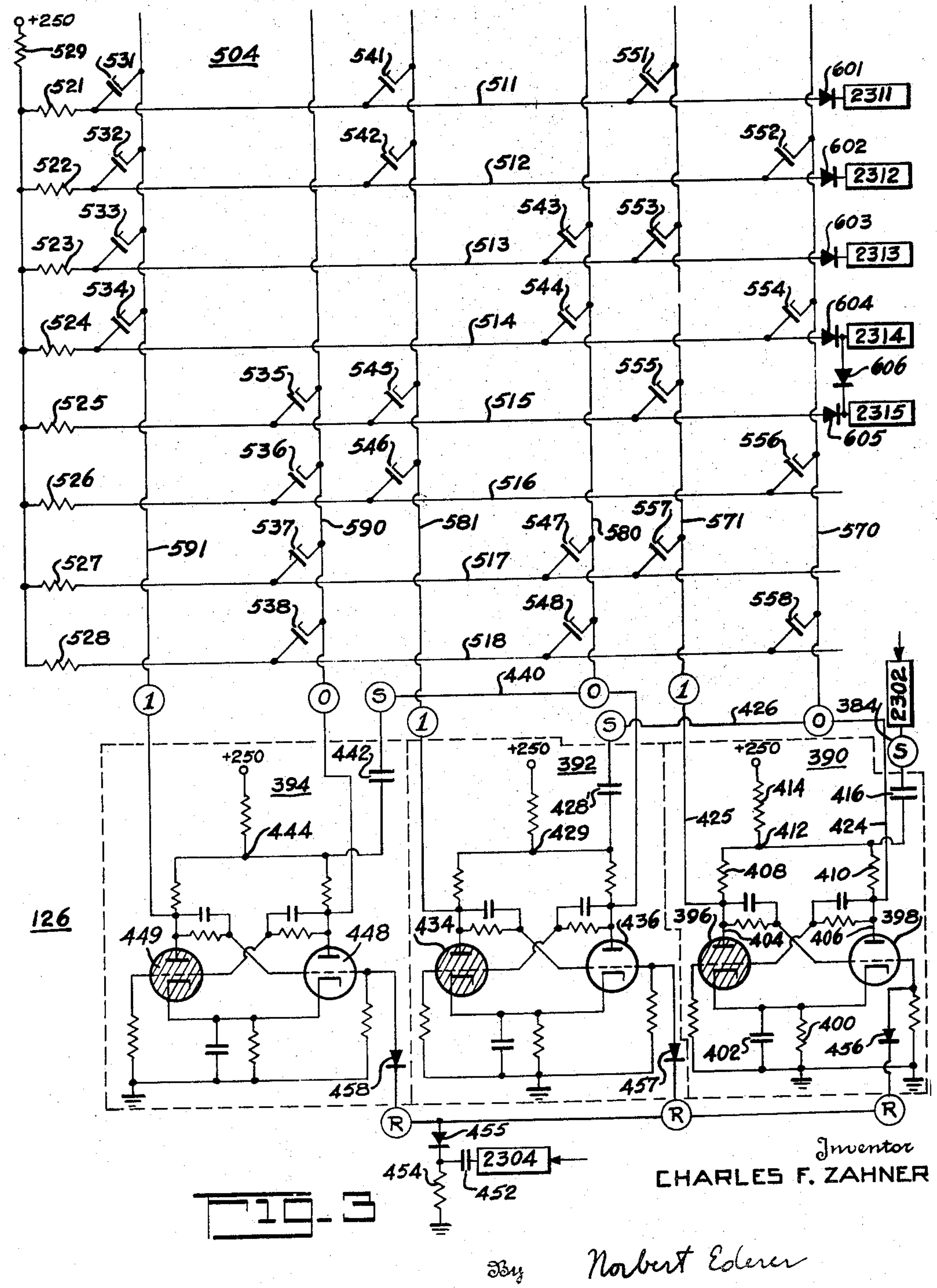
Fig. 3 is a schematic drawing of a portion of the apparatus indicated in Fig. 1 and includes character counting circuitry.
Figure 4:
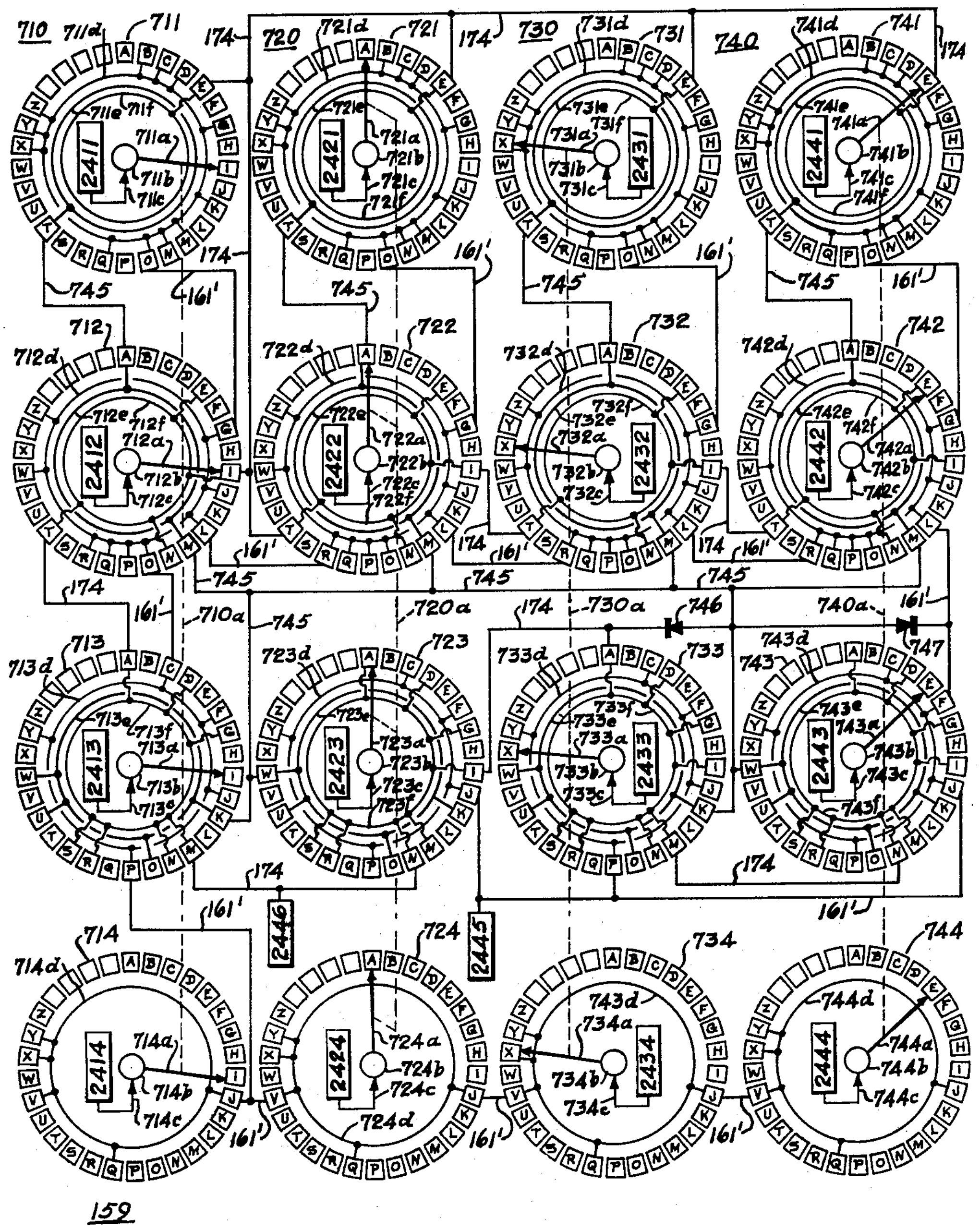
Figure 5:
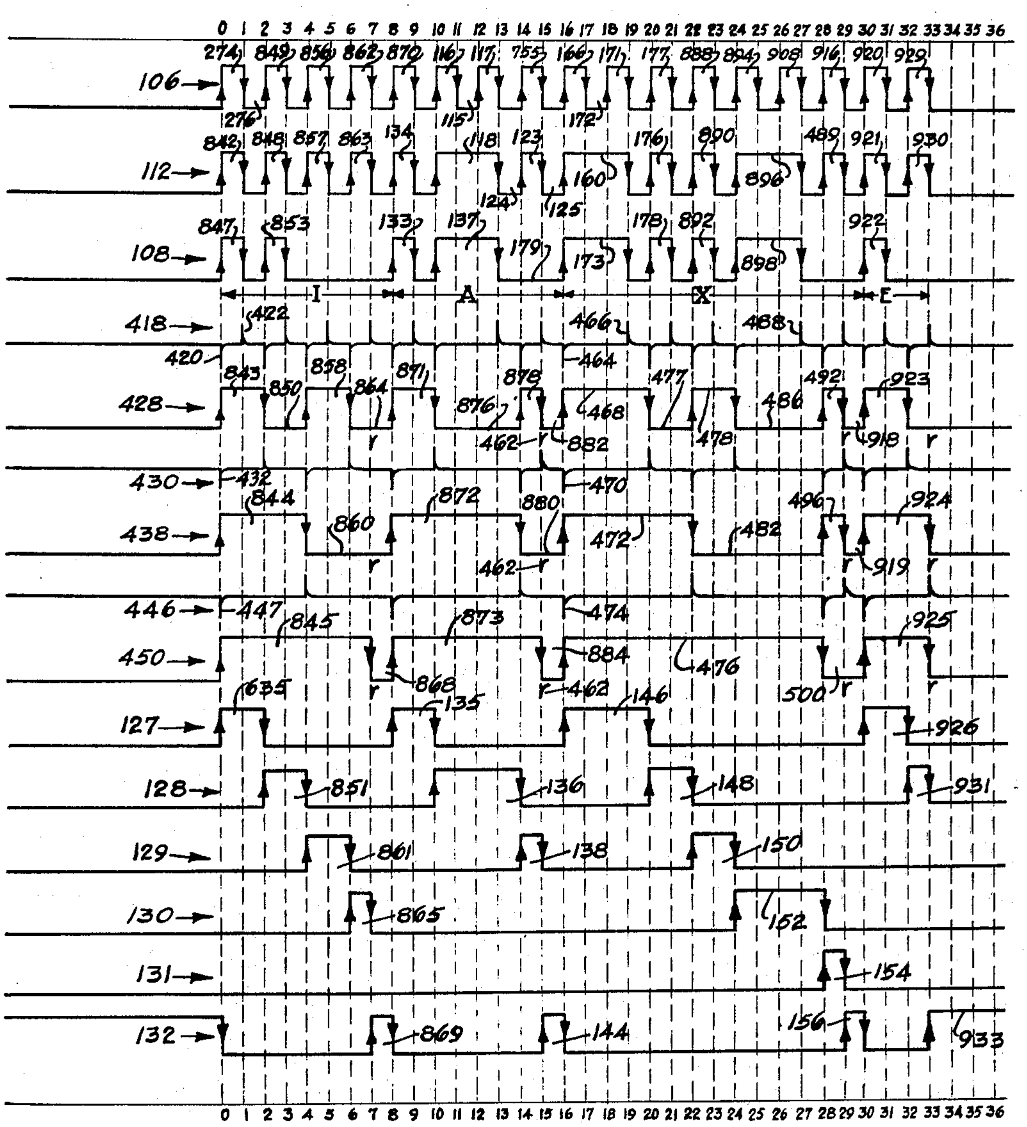
Figure 6:
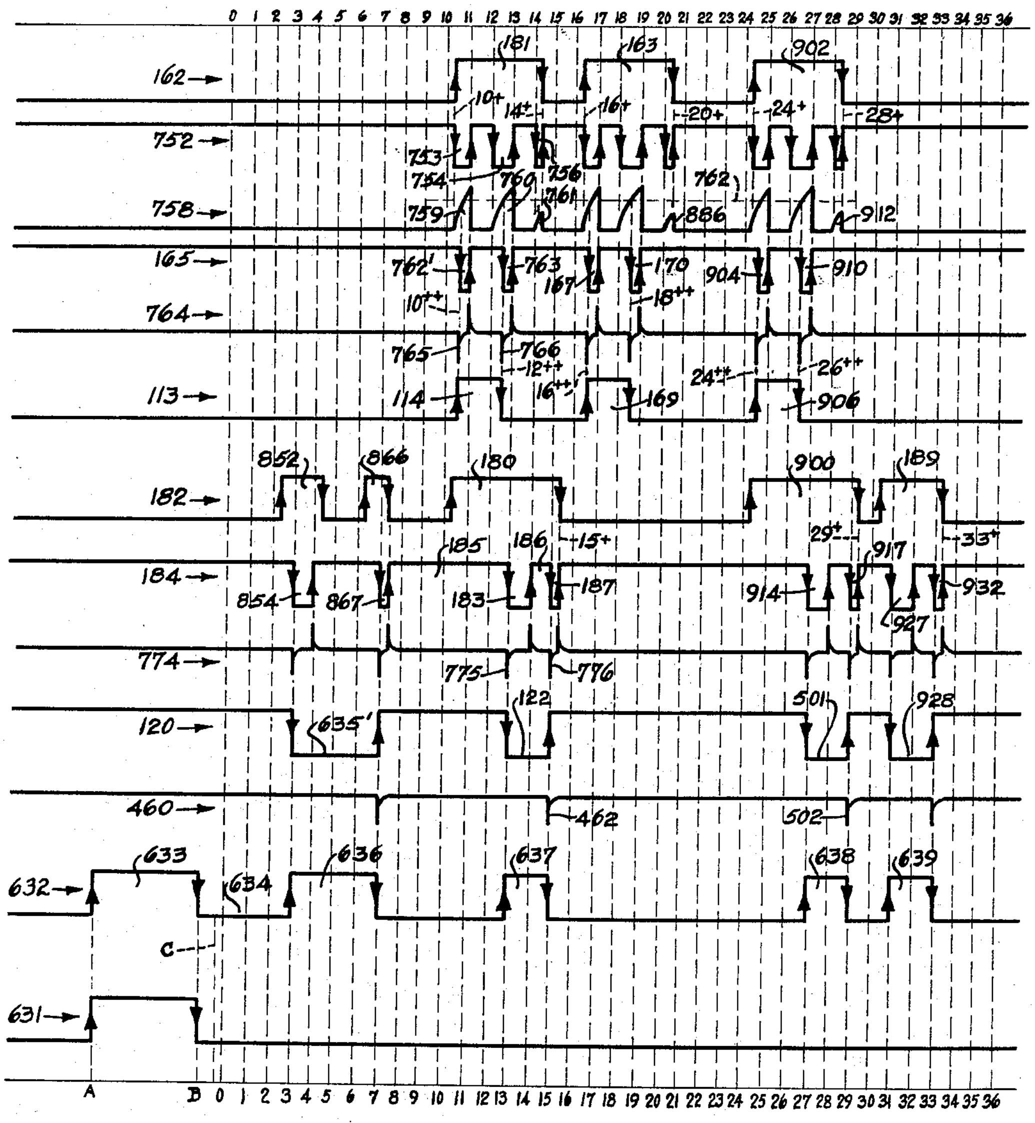

Fig. 4 is a schematic drawing illustrating another portion of the apparatus indicated in Fig. 1 and includes the encoder or memory unit for storing the letters and characters in the sequence; and Figs. 5 and 6 considered as a unit with Fig. 5 placed above Fig. 6 in alignment, are approximate graphical representations of the wave shapes produced by circuit elements in Figs. 2 and 3. Figs. 2 to 4 considered as a unit constitute a single schematic drawing for the automatic digital keyer illustrated in block diagram form in Fig. 1.

The functional organization and operation of the keying apparatus will be understod in a general way by reference to Figs. 1, 5 and 6. Starting means 100 (Fig. 1) controlled by aircraft radio navigation training equipment external to the keyer actuates a stepping switch commutator 102 which responds by advancing to release a time base generator 104 previously held blocked in the original position of commutator 102. The time base generator 104 is a free-running multivibrator which generates a square wave train 106 of fixed pulse width and at a rate of approximately 5 c.p.s. for the duration of a station identification signal sequence (Fig. 5). By way of example it is assumed that the simulated radio station has identification letters AXE; moreover it is assumed to be an ILS station so that the complete signal is the Morse Code representation of IAXE as indicated at 108, except that the end of the second dot of the letter I occurring at the time 3 and the beginning of the initial dot of the letter A at time 8 are separated by five spaces instead of the usual three spaces as illustrated at 108 in Fig. 5. As shown the letter I commences at the time 0 and includes two dots; the letter A commences at the time 8 and includes a dot and a dash; the letter X commences at the time 16 and includes a dash, two dots and another dash; and the letter E commences at the time 30 and includes a dot.

For the purpose of deriving the pulse train 108 from the pulse train 106, the output of the time base generator 104 is fed to a character trigger stage 110 (Fig. 1) which produces an output pulse train 112 which is similar to train 106 but with the required dashes inserted; the ultimately desired pulse train 108 is similar to train 112 but with the long spaces inserted. The pulse train 112 is produced by a combination of square wave train 106 and another pulse train 113 (Fig. 6). A pulse in train 113, such as the pulse 114 which commences at the time 10++ and ends at the time 12++, may be regarded as suppressing the short space pulse 115 in the train 106 or may be regarded as bridging the two dot pulses 116 and 117 which occur in the train 106 respectively immediately before and after the short space pulse 115. The pulse 116 commences at the time 10 and terminates at the time 11, at which time the short space pulse 115 commences. Pulse 115 terminates at the time 12, at which time pulse 117 commences, lasting thereafter until the time 13.

The derivation of pulse train 113 will be discussed hereinafter; suffice it to state for the present that the requirement of a dash beginning at the time 10 is determined effectively at the time 10++; since the dot bridging pulse 114 also commences at the time 10++, it is permissible to derive pulse 114 from the dash pulse 118 in train 112. Pulse 118 is coinitial with the pulse 116 and represents the output of the character trigger 110 responsive to the bridging of the pulses 116 and 117 by pulse 114. Stated somewhat differently, input pulse 116 gives immediate rise to at least the beginning of output pulse 118, which in turn gives rise to input pulse 114, which with input pulses 116 and 117 completes output pulse 118.

Pulse train 112 is fed to a long space mixer 119 (Fig. 1), which produces the desired output pulse train 108 responsive to the pulse train 112 and a long space producing pulse train 120 (Fig. 6). An audio tone generator 121 is keyed or gated by the pulses of train 108 and the audio tone as keyed according to the station identification signal is fed to ear phones of the student pilot.

A negative pulse in the train 120, such as the pulse 122 which commences at the time 13 and terminates at the time 15 may be regarded as suppressing the dot pulse 123 in train 112. Pulse 123 commences at the time 14 and terminates at the time 15. Alternatively the pulse 122 may be regarded as bridging the two short space pulses 124 and 125 which occur in train 112 respectively immediately before and after the dot pulse 123.

The derivation of the pulse train 120 will be discussed hereinafter; suffice it to state for the present that it is derived from the output of the character trigger as was the dash producing pulse train 113. Thus the beginning of the pulse 124 gives immediate rise to the coinitial pulse 122 which suppresses the pulse 123 coterminal with pulse 122.

The derivation of the pulse trains 113 and 120 will be discussed next. An output similar to the pulse train 112 except for reversal of polarity is fed from the character trigger 110 to a character counter 126 which is provided with five count outputs corresponding to the possible first five counts per Morse Code letter. The wave shapes for these five count outputs are illustrated in order as at 127, 128, 129, 130 and 131 in Fig. 5. As previously explained, the number of counts contained in a letter equals the number of intelligence characters contained in such letter plus two. The second of the two additional counts may be regarded as the last count of such letter on the "zeroth" or reset count for the next succeeding letter. The pulse train embracing the reset count pulses is illustrated at 132 in Fig. 5. The reset count is generated within the character counter 126 but is not employed externally thereof; the wave shape 132 is included to illustrate the complete count sequence.

Considering the wave shapes 108, 112 and 127 to 132 simultaneously insofar as they apply to the letter A between the times 8 and 16, it is noted that coinitially with the dot pulses 133 and 134 occurring between the times 8 and 9 there is generated the first count pulse 135. However pulse 135 terminates at the time 10, at which time there commence the second count pulse 136 and also the second intelligence character pulse, a dash pulse indicated by 118 and 137 in trains 112 and 108 respectively. Whereas pulses 118 and 137 terminate at time 13, the count pulse terminates at time 14, at which time the third count pulse 138 commences coinitially with the pulse 123 in pulse train 112.

In general dot count pulses such as 135 are of a duration of two units of time, whereas dash-count pulses such as 136 are of a duration of four units of time. The count pulse following the last of the intelligence character count pulses, hereinafter also referred to as a long space count pulse, is of a duration of one unit of time. For example count pulse 138 as shown commences at the time 14 and terminates at a time 15 and is concurrent with its corresponding dot pulse 123.

Since the letter A is composed of only two intelligence characters, a three count sequence (apart from the reset count) is produced therefor; the two intelligence characters give rise to counts 1 and 2 as represented by pulses 135 and 136, whereas count 3 is represented by the long space count pulse 138; the counts four and five are not produced. At the termination of the long space count pulse 138 there is generated the reset count pulse 144 commencing at the time 15 and terminating at the time 16. The time 16 marks the beginning of a new sequence of counts for the letter X which is composed of the full four intelligence characters so that four intelligence character count pulses (see pulse train 108 between the times 16 and 30) and a fifth, long space count pulse, indicated at 146, 148, 150, 152 and 154 respectively are generated. Upon termination of the long space count pulse 154 there is produced another reset count pulse 156 similar to the pulse 144.

As stated, the character counter 126 is provided with four output lines corresponding to the four possible intelligence character count pulses and represented collectively by connection 157; it is further provided with a fifth output line 158 for delivery of the long space count for the Morse Code letters having the full four intelligence characters namely letters B, C, F, H, J, L, P, Q, V, X, Y, Z. The first four count output lines 157 are connected to an encoder or memory unit 159 through the stepping switch commutator 102. The fourth count output line is additionally connected to the fifth count output line at the character counter 126 so that the fourth, long space count pulse of letters having but three intelligence characters is transmitted also over the count 5 output line 158. The letters D, G, K, O, R, S, U, W fall into this category. In the case of letters having but two intelligence characters, the long space count is delivered over the count 3 output line, whereas in the case of letters having but one intelligence character the long space count is delivered over the count 2 output line.

The encoder 159 includes circuit means for encoding the characters of a transmitted letter. The encoder is provided with four such circuit means for each of the letters connectable respectively to the aforesaid four count output lines.

The generation of count pulses, dashes and long spaces is as follows: at a given even-numbered time (including 0) at which a dot or a dash is to commence or at which a dot is to be suppressed to produce a long space, a pulse is delivered from the character trigger 110 to the character counter 126 and advances the character counter so that a count pulse is delivered to the appropriate count output line. For example at the time 16 the positive character trigger pulse 160 in the train 112 commences. The advantage pulse delivered to the character counter is similar to the pulse 160, but of opposite, negative polarity and at the time 16 advances the character counter to the count 1. As a result the co-initial count 1 pulse 146 is delivered from the character counter 126 through the commutator 102 to the encoder 159 and arrives at the device encoding the first intelligence character of the letter X. As yet neither the advance pulse nor the count 1 pulse "know" their prospective durations, i.e. whether a dot or a dash is to be produced or whether a dot is suppressed to produce a long space. Because a dash is required commencing at the time 16, an output circuit path is provided from the encoding device in question to a dash trigger unit 161. The circuit path will also be referred to hereinafter as the dash return or the short space suppress return. In similar manner all the dash encoding devices in the encoder 159 are connected over the dash return to the dash trigger 161. The pulse train appearing on the dash return is the train 162 (Fig. 6) and the pulse 163 therein corresponds to the dash pulse 160 and the dash count pulse 146. As shown the pulses in the train 162, such as the pulse 163 are of a duration of 4 units of time, and are delayed with reference to the corresponding pulses in the train 112; thus the pulse 163 commences at the time 16+ and terminates at the time 20+.

The dash trigger 161 also receives continuously a pulse train effectively the same as the train 106 from the time base generator 104. The trains 162 and 106 are combined at the dash trigger unit 161 in an AND circuit, in the sense that the dash trigger 161 provides a dash producing negative output pulse if and only if both inputs thereto are at the higher of their two respective significant potentials. Thus the pulse train 162 had been at the lower potential before the time 16+, so that the dash trigger 161 had produced a positive pulse, ineffective to produce a dash. At the time 16 the positive multivibrator pulse 166 had commenced, so that at the time 16+, the conditions for AND circuit operation of the dash trigger 161 are satisfied. However, commencement of the resultant negative dash trigger pulse 167 is further delayed until the time 16++.

The pulse 167 is transmitted from the dash trigger 161 to a dash counter 168 and gives rise thereat to the co-initial short space suppressing pulse 169 in the train 113. The dash counter 168 produces positive pulses such as 169 which commence co-initially with the first of two consecutive negative pulses in the train 165 and terminate concurrently with the commencement of the second of such pulses, herein 170. The pulse 167 is terminated at the time 17 in view of the fact that the multivibrator pulse 166 terminates at the time 17. The termination of the pulses in the train 165 is without delay. The pulse 169 is kept alive as it does not terminate until the commencement of the next pulse 170 in the train 165 from the dash trigger 161. This, as will be seen, occurs at the time 18++, i.e. subsequent to the time 18.

The character trigger 110 operates in logical OR circuit fashion in that its output as reflected in the train 112 is at the higher potential so long as at least one of the inputs thereto from the time base generator 104 and the dash counter 168 are at the higher of their two respective significant potentials. This condition is satisfied by the pulse 166 between the times 16 and 17, by the pulse 169 from the time 16++ to the time 18++ and by the next positive multivrator pulse 171 in the train 106 between the times 18 and 19. Consequently the two dot pulses 166 and 171 are bridged by the pulse 169. The negative time base generator pulse 172, which spaces the positive dot pulses 166 and 171, is suppressed from the output of the character trigger 110, giving rise to the dash pulse 160 in the train 112 and the similar dash pulse 173 in the final output train 108. This also renders the count pulse 146 a dash count pulse keeping it alive until the time 20, and as such the pulse 146 continues to feed from the character counter through the commutator 102 and encoder 159 over the dash return 160 to the dash trigger 161 in the form of the pulse 163. At the time 17 the positive multivibrator pulse 166 terminates and the negative pulse 172 commences so that the conditions for AND circuit operation of the dash trigger 161 are no longer satisfied; the negative dash trigger pulse 167 terminates. At the time 18 the negative multivibrator pulse 172 terminates and the positive pulse 171 commences, and with the pulse 163 still alive, the condition for AND circuit operation of the dash trigger is satisfied once more to produce the negative pulse 170 in the pulse train 165. As shown pulse 170 commences after some delay at the time 18++, and consequently terminates the bridging pulse 169. The pulse 170 is terminated in turn by the termination of the multivibrator pulse 171 at the time 19.

The described manner of generation of the dash pulse 160 is typical of generation of dash pulses in general. The dash encoding devices in the encoder 159 are connected over the dash return to the dash trigger 161, whether a dash is generated at the counts 1, 2, 3 or 4. As will be seen hereinafter, a dash encoding device is connected solely to the dash return where a dash is generated at the count 4, and where a dash is generated at the counts 1, 2 or 3 and is not followed by a long space. In all other instances, i.e. where a dash is generated at the counts 1, 2 or 3 and is followed by a long space, the appropriate encoding device is additionally connected over a main space return line 174, also referred to as the main dot suppress line, to a space trigger unit 175.

Where a dot is to be generated at the count 4, or where it is to be generated at the counts 1, 2 or 3 but not to be followed by a long space, the following description of generation of the dot pulse 176 in train 112, which commences at the time 20 and terminates at the time 21, is typical. At the time 20 the positive multivibrator pulse 177 is delivered from the time base generator 104 to the character trigger 110 and initiates the pulse 176. An advance pulse similar to the pulse 176 but of negative polarity is fed from the character trigger 110 to the character counter 126, and as such advances the character counter to the then appropriate count 2 to initiate the count 2 pulse 148. At the time 20 neither the advance pulse nor the pulse 148 "know" as yet whether a dot or a dash or a long space is to be generated. The pulse 148 is transmitted through the commutator 102 to the appropriate encoding device in the encoder 159 and finds an open circuit thereat. As a result the dash trigger 161 is not triggered, the space trigger 175 is not triggered, and the dash counter 168 produces no bridging pulse so that the pulse 176 remains a dot pulse and a corresponding dot pulse 178 is delivered by the long space mixer 119. As a consequence the pulse 148 remains a dot count pulse. The manner of generation of the dot count pulse is also typical for the generation of a dot as the last intelligence character of a letter at the counts 1, 2 or 3, but in such case as in the case where a dash was the last intelligence character of a letter at the counts 1, 2 or 3, an output circuit path is provided from the appropriate encoding device to the space trigger 175 over the space return 174.

In the case where a space is to be generated for a letter having one or two intelligence characters the manner of generation of the long space pulse 179 which follows the dash pulse 137 in the train 108, is typical. The last intelligence character count pulse, herein the count 2 pulse 136 which commences at the time 10 and terminates at the time 14, arrives at the encoder 159 at the time 10 and gives effect to the generation of the dash pulse 118 as previously discussed. For the present discussion of long space generation the dash pulse generation is merely incidental, because insofar as the generation of a long space is concerned, the result, except for the generation of the dash, would be similar were the pulse 136 a dot count pulse instead. The device encoding the last intelligence character of the letter A is connected over the space return 174 to the space trigger 175.

The pulse 136, as it appears on the main space return line 174, is indicated in Fig. 6 as at 180 in pulse train 182. As shown, it commences co-initially with the corresponding dash count pulse 181 in train 162, i.e. at the time 10+, delayed somewhat from the positive multivibrator pulse 116. The pulse train 182 represents the pulses arriving at the space trigger 175 from both the main space return line 174 and the special space return line 158. These space return lines are interconnected at the input of the space trigger 175, which also receives from the character trigger 110 over an input line 182' a long space producing pulse train similar to the train 112, but of opposite polarity. The pulse train 182 and the space producing character trigger train are connected at the space trigger in an AND circuit, in the sense that the space trigger produces a negative pulse 183 in its output train 184, if and only if both input pulse trains to the space trigger 175 are at their respective higher potentials. Beginning at the time 10, the character trigger 110 had delivered to the space trigger 175 a pulse, corresponding to the pulse 118 in the train 112 but of negative polarity. This pulse terminated at the time 13, so that the condition for AND circuit operation was not satisfied until the time 13, even though the potential reflected by the train 182 was the higher one from the time 10+ to the time 13. As a consequence the ineffective positive pulse 185 continued in the train 184 until the time 13. At the time 13 the negative pulse corresponding to the pulse 118 terminates, and a positive pulse corresponding to the pulse 124 in the train 112 commences, satisfying the conditions for AND circuit operation. The positive pulse 185 is terminated and the negative pulse 183 commences in the train 184.

At the time 14 the count 2 pulse 136 terminates; however the space return pulse 180 is kept alive by the concurrent arrival at the main space return line 174 of the count 3 long space count pulse 138. The termination of pulse 136 and the initiation of pulse 138 is due to the initiation of the positive character trigger pulse 123. The pulse 138 is transmitted from the character counter 126 through the commutator 102 to the third encoding device for the letter A in encoder 159, where it finds an output circuit connection to the main space return 174. As such it keeps the space return pulse 180 in train 182 alive.

The initiation of the character trigger pulse 123 has a second bearing on the long space generation. The thereto corresponding negative pulse delivered from the character trigger 110 over line 182' to the space trigger 175 renders the conditions for AND circuit operation once more not satisfied. Consequently the negative pulse 183 in the train 184 terminates at the time 14 and the positive pulse 186 commences and lasts thereafter until the time 15, i.e. the termination of the negative pulse corresponding to the pulse 123 in the train 112 and the commencement of the positive pulse corresponding to the pulse 125. At the time 15 the conditions for AND circuit operation are once more satisfied, so that the positive pulse 186 terminates and the negative pulse 187 in the train 184 commences. The pulse 187 thereafter lasts until the termination of the pulse 180 at the time 15+, at which time the conditions for AND circuit operation of the space trigger 175 are once more not satisfied. The pulse 187 terminates concurrently with the pulse 180. The pulse 180 is delayed in a manner similar to that of pulse 181.

The space trigger 175 supplies its signals in the train 184 to a space counter stage 188 which produces a negative pulse 122 in the aforementioned train 120 at the commencement of the first of the two negative pulses, such as 185 and 187 and which terminates with the commencement of the second such negative pulse. As shown the negative pulse 122 commences at the time 13 and terminates at the time 15. The pulse 122 is transmitted from the space counter 188 to the long space mixer 119 and as such is effective to suppress the pulse 123 and to bridge the pulses 124 and 125, and thus to produce the long space pulse 179 in the final output train 108. The termination of pulse 122 effects termination of the long space count pulse 138 by reason of the resetting of the character counter 126, as will be seen hereinafter.

The pulses in the train 182 are generally of a duration of the last intelligence character pulse of the particular letter plus 1 unit of time, i.e. 5 units of time long, as the pulse 180, in case the last intelligence character is a dash, or 3 units of time long in case the last intelligence character is a dot, as is the case, for example, for the pulse 189 corresponding to the letter E. The negative pulses in the train 120 are generally of a duration of two units of time, as they commence with the termination of the last intelligence character of a letter, whether a dot or a dash, and terminate two units of time thereafter.

In the case where a long space is to be generated for a letter having three intelligence characters the manner of generation of the long space pulse is similar except that the long space count pulse is delivered not over the main dot suppress line 174, but over the special dot suppress line 158. This is in view of the fact that the count 4 line is connected to the count 5 line at the character counter as aforestated. In such case as the third intelligence character count pulse arrives at the encoder 159, it finds the encoding device which is connected to the space trigger 175 over the main dot suppress line 174, and which is incidentally also connected to the dash return line 160 if the third intelligence character of the particular letter is a dash. Thereafter the count 4 long space count is transmitted from the character counter 126 over the count 4 line, through the commutator 102 to the encoder 159 where it finds an open circuit; it is also transmitted directly over line 158 to the space trigger 175 to keep alive the pulse in train 182 commenced by the count 3 pulse which had arrived over line 174.

In the case of a letter composed of the full four intelligence characters, the count 4 pulse is transmitted from the character counter 126 over line 157, through the commutator 102 to the encoder 159 where it finds an open circuit if the fourth intelligence character of the letter is a dot, or finds an output connection to the dash return 160 if such fourth intelligence character is a dash. In any event it does not find a path to the space trigger 175. Instead the path to the space trigger is from the character counter 126 directly over the line 158; at the termination of count 4 the count 5 long space pulse is also transmitted over line 158 to the space trigger and keeps alive the pulse in the train 182 previously commenced by the count 4 pulse.

Upon the termination of the long space count pulse of a given letter the reset pulse is generated so that in the case of letters having two or one intelligence characters some of the intelligence character count lines will have no count pulses produced thereon. For example in the case of the letter A the advance is from the count 3 represented by the long space count pulse 138 to the reset pulse 144 so that with transmission of the letter A the count 4 pulse is not ever produced. The count 4 line is nevertheless connected to a fourth character encoding device for the letter A in the encoding unit 159, but no output circuit is provided therefrom. More generally for the case of letters having only one or two intelligence characters there will be provided respectively two and one character encoding devices having no output circuit and connected respectively to the count lines 3, 4 and 4. The keying apparatus is intended for the generation of any desired combination of call-letters and for this reason the unused count lines and character encoding devices must be supplied. If the letter A were changed to a V the fourth count line and character encoding device would be used.

As stated, the first four count outputs of the character counter 126 are connected respectively to the four character encoding devices of a given letter within encoder 159. At the end of such letter it is necessary to collectively commutate the four count outputs to the four character encoding devices of the next letter in the sequence. The stepping switch 102 constitutes such a commutation means. It is prepared for actuation by positive pulses in a train similar to train 120 but of opposite polarity, the commutator advances at the terminations of such pulses, which are concurrent with the terminations of the negative pulses in the train 120. To this end the space counter 188 is also connected to the commutator 102 through an advance line 190.

The space counter also resets the character counter 126 by supplying an input thereto over line 192 at the end of the long space count of a letter, whether such count be 2, 3, 4 or 5, so that the counting sequence of the character counter 126 for the next sequence of characters begin with count one. The commutator 102 cooperating with the counter 126 constitutes a means for systematically searching the encoder 159 for encoded dashes and long spaces; when a dash is found in encoder 159, a short space suppressing pulse is generated by unit 168, whereas when a long space is found in encoder 159, a dot suppressing pulse is produced by unit 188.

At the termination of a complete sequence of station identification call letters the commutator returns to its initial quiescent position and as such blocks further square wave generation by the time base generator 104 until a new start signal is applied from the starting unit 100. The character counter 126 is reset with the termination of the last reset count pulse; the dash counter 168 and the space counter 188 are inherently reset at the end of their dash-producing and long-space-producing pulses respectively; therefore the fact of cessation of square wave generation leaves the counters and the commutator 102 in readiness for generation of another sequence, initiated by the starting means 100 once more.

The keyer circuitry will now be discussed in greater detail with reference to Figs. 2 to 4 and for the case of transmisison of the call letters IAXE as previously assumed. Other modes of operation will be described hereinafter.

In Figs. 2 to 4 a number of conventions have been adopted to aid in the interpretation and tracing of the circuitry described. Referring to Fig. 2 for example, it is noted that the envelopes of some of the vacuum tubes shown therein are hatched whereas others are not hatched. The former represent tubes which are usually conducting and in fact biased for saturation (zero bias), whereas the latter are usually non-conducting or cut off. "Usualism" as used herein refers to the state of the circuitry during the time intervals between successive transmissions of a station identification signal. A circuit interconnection between two figures is represented by a rectangular block enclosing in each of the figures one and the same four-digit reference numeral, whose thousands and hundreds digits refer to the two figures between which interconnection is made. For example a terminal 382 is tied to interconnection 2302 in Fig. 2; referring to Fig. 3 interconnection 2302 is also found therein and as shown is tied to a terminal 384. The circuit is traced "from terminal 382 over interconnection 2304 to terminal 384" and this language is typical of the description of circuitry having "interconnections" represented by a rectangular block enclosing a four-digit reference numeral. The location in Figs. 2 and 3 is implicit. "Normalcy" as used herein with reference to the state of relay contacts is intended to signify such state with all sources of energization disconnected. However, as a further aid in the interpretation, the relays are represented in the usual condition for a four-letter sequence. For example relay 372 (Fig. 2) is usually energized, hence connection through its normally open (NO) contact 1 is usually complete as shown. On the other hand relay 370 (Fig. 2) is usually deenergized and hence connection through its NO contact 1 is, as shown, usually incomplete; connection is usually complete through its normally closed (NC) contact 1, as shown.

In the interest of avoiding confusing long wires having multiple bands or corners, and similarly confusing multiple wire crossings, the aforediscussed representation of an interconnection is also employed for interconnection of circuitry appearing on one and the same figure. In such case the thousands and hundreds digits of the associated reference numeral are alike and are the same as the number of the figure wherein this reference numeral is found twice. For example, an interconnection labeled 2202 is found in two places in Fig. 2 and as shown interconnects a contact **256*b* and the cathode of a diode 260**.

As previously indicated, upon termination of transmission of a sequence the keyer apparatus is reset to the usual condition illustrated in Figs. 2 to 4, wherein the square wave generation of the multivibrator 104 is blocked, wherein the character counter 126 is reset to the count 0 in readiness for advance to the count 1 of the initial intelligence character of the first letter of the following sequence of letters, and wherein the commutator 102 is reset to an off-position or zero position in readiness for advance to the position corresponding to the first letter of the following sequence. When power is initially applied to the keyer apparatus, the setting of the counters and of the commutator 102 is random and may be such that a false sequence or an incomplete sequence of letters is generated; however, as will be apparent hereinafter, at the termination of such false or incomplete sequence the apparatus is necessarily reset to the usual condition illustrated in Figs. 2 to 4.

Referring to Fig. 2 the stepping switch 102 is composed of six decks of rotary switches designated generally as 191 to 196 respectively. The decks are similar in construction and are operable in unison in the sense that connection is made at any given instant through corresponding contacts of the several decks. Considering the sixth deck 196, which is typical of the other decks as to structure, deck 196 includes five angularly equi-spaced contacts designated by reference numerals 206, 216, 226, 236 and 246 respectively. The common units' digit 6 is intended to signify the sixth deck whereas the tens' digits 0, 1, 2, 3, and 4 are intended to signify the positions of the stepping switch 102 wherein connection is made from the respective stationary contact to a rotatable contact 256. These positions, as will be seen hereinafter, are in order, the off-position of the commutator corresponding to the times preceding and following transmission of a sequence, and the positions sequentially assumed thereby for transmission of the four letters in the sequence. As shown −28 volts D.C. is applied to the contact 206 in the 0 or reset or off-position of the stepping switch 102 to the rotatable contact 256, thence to a slip ring 256*a* secured to the rotatable contact 256 and rotatable in unison therewith, and thence to a stationary brush 256*b* which engages the slip ring 256*a* continuously, thence over interconnection 2202 to the cathode and then the anode of a diode 260 to the grid 262 of the usually non-conducting triode 264 of the multivibrator 104. The diode 260 is provided to permit transmission of the negative voltage from the cathode to the anode but to block transmission of a negative voltage in the opposite direction to preclude cross-talk. Diodes similar to the diode 260 will be referred to as blocking diodes hereinafter, as will also be diodes provided for transmission of a positive voltage from the anode to the cathode but to block transmission of a positive voltage in the reverse direction. The application of −28 volts to the grid 262 through the diode 260 assures that the square wave generation of the multivibrator 104 is blocked. The triode 264 is cut off in view of the low potential at its grid 262, whereas the other triode 266 is in its usual conducting state. The multi-vibrator 104 is of the cathode-coupled astable type and is provided with a dual potentiometer whose two sections 268 and 270 are included in the timing circuits of the triodes 264 and 266 respectively to permit manual adjustment of the multi-vibrator frequency, which as stated is approximately 5 c.p.s. The potential of the anode 272 of the usually conducting triode 266 is reflected in Fig. 5 by the wave train 106 and as shown is at the lower of the two significant potentials prior to the time 0. As will be seen hereinafter, due to the action of the starting means 100 the rotatable contact 256 is disconnected from the stationary contact 206 at the time 0 thereby terminating the application of −28 volts to the grid 262 to commence the square wave generation. The triode 262 is rendered conductive and the triode 266 is rendered non-conductive, so that the potential at the anode 272 rises to the plate supply potential of +250 volts, thereby commencing the first positive pulse 274 in wave train 106. At the time 1 the pulse 274 ends, the triodes 264 and 266 resume their usual conditions. The voltage at the anode 272 drops to the lower anode potential corresponding to plate current saturation of the triode 266 as reflected by the negative going trailing edge of the pulse 274, thereby commencing a negative pulse 276 in the train 106. The square wave generation proceeds in well-known manner with changes from the low potential to the high potential at the even-numbered times (including 0) and vice-versa at the odd-numbered times.

The pulse train 106 which reflects the voltage of anode 272 is direct coupled through a resistor 278 to an end of a resistor 280, whose other end is grounded to provide voltage division at the point of junction 282. The further transmission is from the junction point 282 through the anode and then through the cathode of a blocking diode 314 to a junction point 315. The anode of diode 314 provides an input to an OR gate 318; a second OR gate input is provided by a diode 320 whose cathode is also tied to junction point 315. As will be seen hereinafter the dash producing positive pulses from the dash counter 168 are transmitted through the second input of the OR gate 318, i.e. diode 320, to the junction point 315.

Circuit junction 315 is at the higher of two significant potentials, if and only if at least one of the OR gate inputs is at the higher of two possible potentials; hence the denomination OR gate, the "OR" being the conjunctive "OR." Prior to the time 0 both inputs to the gate 318 are at the lower of their respective two possible potentials, namely the potential of anode 272 as divided down and the potential then prevailing at an output terminal 321 of the dash trigger, which is transmitted to the anode of diode 320 through a voltage dropping resistor 322. The gate is therefore closed before the time 0 and hence the junction point 315 is then at the lower of two significant potentials, which is transmitted to an input terminal 323 of the character trigger 110 which is also identified by the designation "IN" inserted in a circle. The character trigger 110 is typical of the other trigger circuits used in the keyer apparatus herein described and as such will be illustrated and described in greater detail. The other trigger circuits will be identified simply by a rectangle enclosing the letter T and appropriate input and output terminals which correspond functionally to the input and output terminals of the character trigger 110 as indicated by corresponding inscriptions within such terminals, and which are connected interiorly to circuitry corresponding to that of trigger 110, including its usually conducting and non-conducting tubes.

The character trigger 110 is a Schmitt-type trigger circuit. It includes a grid current limiting resistor 324 connecting the input terminal 323 to the grid 325 of the usually non-conducting triode 326. The triode 326 is usually non-conducting by reason of the low potential usually prevailing at the input terminal 323. The anode 327 of triode 326 is connected through a plate load resistor 328 to +250 volts and also through a voltage dividing resistor 329 to the grid 330 of the usually conducting triode 331 and thence through the cooperating voltage dividing resistor 332 to ground. By reason of the cut off of the triode 326 its anode 327 is at a potential of essentially +250 volts, which high potential is divided down by resistors 329 and 332 at the grid 330 and as such assures that the triode 331 shall be usually conducting. The anode 333 of triode 331 is connected through a plate load resistor 334 to +250 volts and is by reason of the usual conducting state of the triode 331 usually at the lower of its two significant potentials. The cathodes of the triodes 326 and 331 are, as shown, tied together and connected through a bias and coupling resistor 335 to ground. The cathode coupling assures further that the triode 326 shall be non-conducting.

The trigger operates in well-known regenerative manner. The regeneration is provided by the plate to grid coupling from triode 326 to triode 331 and through the cathode coupling of the triodes. At the time 0 the application of the multivibrator pulse 274 inverts the states of the triodes 326 and 331, the potential of anode 327 dropping to saturation potential and the potential of the anode 333 rising to the high cut off potential of nearly +250 volts. When at the time 1 the potential at the input terminal 323 reverts to the usual lower potential, the triodes and their anodes return to their respective usual conditions. A capacitor 336 shunts the resistor 329 to speed-up the regenerative action and produce fast pulses.

The trigger 110 is provided with two "positive" output terminals designated by circles enclosing the reference characters $\overset{+}{A}$ and $\overset{+}{B}$, and two "negative" output terminals designated by circles enclosing the reference characters $\bar{A}$ and $\bar{B}$ respectively. The output terminals are "positive" and "negative" in the sense that they are respectively at the higher and lower potentials when the input terminal 323 is at its higher potential. Stated differently, they are usually at the lower and higher potentials respectively. The negative B terminal as shown is connected directly to the anode 327 of the usually non-conducting triode 326; it is not utilized as such externally of the trigger 110 but has been included to indicate the connection of the identically labeled output terminals of other trigger stages. The remaining output terminals are connected to respective anodes of the trigger 110 through voltage dividing resistors to provide the required drop in level necessitated by the direct coupling used throughout the keying apparatus. Thus the negative A terminal is also connected to the anode 327 of triode 326, but through a voltage dividing resistor 337, and is further connected through a cooperating voltage dividing resistor 338 to ground. The positive outputs are derived through similar voltage dividers from the anode 333 of the usually conducting triode 331. Differing output levels are obtained at the positive A and B output terminals, in view of the fact that the respective associated resistors 339 and 340 are connected to ground and −28 volts D.C. respectively. The trigger circuits used in the keyer herein described, such as the trigger circuit 110, are, except for the voltage dividing resistors, readily available commercially as standard, plug-in type interchangeable units.

The pulse train delivered to the positive output terminals of the trigger 110 is indicated in Fig. 5 by the train 112. The proper dashes are inserted in the train 112 as a result of the delivery, from the dash counter 168, of the pulse train 113 to the OR gate 318 and therefore to the input terminal 323 in the manner previously generally indicated and more fully described hereinafter. The outputs delivered to the negative output terminals of the dash trigger 110 are similar to the pulse train 112 but of opposite polarity.

The pulse train 112 is delivered from the positive B output terminal of the character trigger 110 through the cathode and then through the anode of a diode 345 to a junction point 346. The cathode of diode 345 (connected in the reverse manner for transmission of a positive voltage) provides an input to an AND gate 349. An additional similar input to the AND gate 349 is provided by the diode 350 whose anode is also connected to the junction point 346 and whose cathode is connected through a voltage dividing resistor 351 to an output terminal 352 of the space counter 188, and also through a cooperating voltage dividing resistor 353 to −28 volts D.C. As will be seen hereinafter, the space counter delivers the long space producing pulse train 120 over output terminal 352 and resistor 351.

The AND gate 349 is so named in view of the fact that the potential at the junction 346 is the higher of two possible significant potentials, if and only if the two inputs thereto are respectively at their higher of the two possible potentials. This condition is satisfied by the input through diode 350 in the usual condition in view of the higher potential prevailing at the terminal 352 prior to the time 0; however under the usual conditions the input through diode 345 is at the lower possible potential of the positive B terminal of the trigger 110. In view of the low potential of this input the high potential of the other input is attenuated at the junction 346 by the voltage division through the reverse resistance of the diode 350 and thence through the various paths from junction 346 to ground and −28 volts. One such path is through resistor 340 to −28 volts, the forward resistance of the diode 345 preceding resistor 340, as seen from the input through diode 350, being negligible. Because of such voltage division the potential of the junction 346 is the lower of the two significant ones and this condition is continued until the time 0. The usual quiescent potential of junction 346 is determined in part by a biasing circuit which extends from +250 volts through a level dropping resistor 354 to the junction 346, thence through the anode and then the cathode of a blocking diode 355 through a cooperating level dropping resistor 356 to ground. So long as at least one of the inputs is at the lower possible of its potentials a similar voltage division is effected. The low potential of point 346 is transmitted to the grid 364 of a triode 365 whose cathode is tied to +28 volts and whose anode is connected through the coil 368 of a final output relay 370 to +250 volts. In view of the high net negative grid to cathode bias of triode 365 the triode plate current is usually cut off and the relay 370 is usually deenergized as indicated. Relay 370 constitutes together with gate 349, triode 365 and associated circuitry the long space mixer 119.

At the time 0 the dash trigger 110 shifts from its usual to its alternate state as previously explained, applying the higher potential from its positive B terminal to the AND gate through diode 345. The other input remains at its higher potential so that no significant voltage division occurs through any one of the diodes in gate 349 and resistors connected thereto. As a result the potential at the junction 346 will rise to the higher significant potential, rendering triode 365 conductive and energizing the output relay 370. The movable contact 1 of relay 370 is connected to a test point TP, its NC contact 1 is grounded, whereas its NO contact 1 is connected to +28 volts. The energization and deenergization of relay 370 is accordingly reflected at the test point TP in the form of the finally desired wave shape 108 with the lower ground potential indicated prior to the time 0 and the higher +28 volts indicated beginning at time 0. The NC contact 2 of relay 370 is permanently grounded; its NO contact 2 is connected through the NO contact 1 of a relay 372 assumed for the time being to be permanently energized to the 1020 c.p.s. audio tone generator 121. Accordingly with the energization and deenergization of the relay 370 its movable contact 2 will alternately deliver an audio tone and be grounded. The audio signal on the movable contact 2 of relay 370 will be keyed in accordance with the station identification call letters as reflected by wave shape 108. The keyed audio is fed from the NO contact 2 of relay 370 through the NC contact 1 of a relay 376 presently assumed to be permanently deenergized to an output line 378 leading to the student pilot's earphones.

As previously indicated, the character trigger 110 delivers to the character counter 126 an advancing pulse train similar to train 112 but reversed in polarity. To this end the pulse train obtained at the positive A terminal of the character trigger is applied to the input terminal of a second trigger stage 380, at whose negative B terminal 382 the advancing train is obtained. The train is also available at the negative B terminal of the trigger 110, but the pulses at the negative B terminal of the trigger 380 are sharpened considerably for triggering of the character counter 126. The train is delivered over interconnection 2302 to a set input terminal 384 of the first stage 390 of a three stage binary character counter 126. The additional stages 392 and 394 of counter 126, the dash counter 168 and the space counter 188 are structurally identical to the stage 390. The dash and space counters are therefore identified by a rectangle enclosing the letter C and the corresponding terminals thereof are labeled in corresponding manner. A counter circuit as exemplified by the stage 390 is, except for the diode therein, available commercially as a readily interchangeable standard plug-in unit.

The stage 390 includes the usually conducting triode 396 and the usually non-conducting triode 398 of a well-known symmetrical Eccles-Jordan type trigger or flip-flop or bistable multivibrator circuit whose cathodes are connected together and through a resistor 400 to ground. The resistor 400 is shunted by a by-pass capacitor 402. The anodes 404 and 406 of the triodes 396 and 398 are connected respectively through like resistors 408 and 410 to a circuit junction point 412 which in turn is connected to +250 volts through a resistor 414. The pulse train arriving over connection 2302 to the set input terminal S is passed through a differentiating capacitor 416 to the junction point 412 and is represented in Fig. 5, as differentiated, by the pulse train 418. This incoming wave train is negative going at the time 0 and therefore gives rise to the first differentiated spike 420. At the time 1 the incoming pulse train is positive going and gives rise to the positive differentiated spike 422. The counter stages as typified by stage 390 experience "flipping" action responsive only to the negative differentiated spikes such as 420 and are insensitive to the positive spikes such as 422.

At the time 0 the first negative differentiated spike 420 arrives at the junction 412 and switches the triodes 396 and 398 to their alternate stable states, the triode 396 being rendered non-conducting and the triode 398 being rendered conducting. The potential of the anode 406 drops to the minimum saturation potential and the potential of the anode 404 rises to the cut-off potential. The anode 406 is connected over line 424 to an output terminal 0 and the anode 404 is connected over line 425 to an output terminal 1; the labels 0 and 1 signify binary counts for the stage 390; as indicated these terminals are usually respectively at their higher and lower potentials. This is also true of the corresponding like-labelled terminals of the other stages 392 and 394, and of the dash counter 168, and of the space counter 188. The wave shape produced at the terminal 1 of stage 390 is illustrated in Fig. 5 as at 428. The wave shape at its terminal 0 is of course of opposite polarity and as such is tranmitted over line 426 to the corresponding set input terminal S of the second stage 392 from which it is passed through a differentiating condenser 428' to a junction point 429 which corresponds to the junction point 412 of a stage 390. The incoming wave shape to the stage 392 as differentiated is illustrated in Fig. 5 as at 430. The initial differentiated spike 432 therein, which arrives at the junction point 429 at the time 0, is negative an "flips" stage 392 over, cutting-off the usually conducting triode 434 and turning on the usually non-conducting triode 436. The anode potential of the triode 434 rises, as reflected at the corresponding output terminal 1. The pulse train produced at the terminal 1 of stage 392 is indicated in Fig. 5 as at 438 and is shown as rising at the time 0. The anode potential of the triode 436 drops at the time 0, as reflected at the corresponding output terminal 0. The pulse train at the terminal 0 of stage 392 is of course of opposite polarity to that appearing at the terminal 1 of stage 392, and as such is transmitted over line 440 to the corresponding set input terminal S of the third stage 394, thence through a differentiating condenser 442 similar to differentiating condensers 416 and 428' to a junction point 444, which corresponds to the junction points 412 and 429. The differentiated wave form is indicated in Fig. 5 as at 446. The first differentiated spike 447 therein, arriving at the time 0, is negative and "flips" the third stage over. The potential of the anode of the usually conducting triode 449 rises, as reflected at the corresponding terminal 1, and the potential of the anode of the usually non-conducting triode 448 drops, as reflected at the corresponding terminal 0. The wave shape appearing at the terminal 1 of stage 394 is illustrated in Fig. 5 as at 450, and is shown as rising at the time 0.

The cooperation of the three stages is best explained with reference also to Figs. 5 and 6 for the interval between the times 16 and 30, i.e. the generation of the letter X. At the time 13 a pulse arrives at an interconnection 2304 from the space counter 188. The pulse train transmitted over interconnection 2304 is similar to the previously referred to train 120 illustrated in Fig. 6 but of opposite polarity and the particular pulse in question corresponds to the pulse 122. It has a positive leading edge at the time 13 and a negative trailing edge at the time 15. The pulse corresponding to pulse 122 and more generally the pulse train similar to train 120 but of opposite polarity is passed through a differentiating capacitor 452 to a differentiating resistor 454 whose one end is connected to capacitor 452 and whose other end is grounded. The differentiated train is applied to the cathode and then the anode of a blocking diode 455 which blocks the positive differentiated spike corresponding to the leading edge of pulse 122, but transmits the negative spike corresponding to the trailing edge of pulse 122 to the interconnected reset terminals R of the stages 390, 392 and 394. The spike is further transmitted through the cathodes and then the anodes of respective blocking diodes 456, 457 and 458 to the grids of the usually non-conducting triodes, where it is effective at the time 15 to "flip over" to the usual condition such of the three stages as had not been in the usual condition at the time 15. The train of negative spikes applied to the grids of the usually non-conducting tubes is illustrated in Fig. 6 as at 460. For convenience the spikes are also shown in time alignment below the three wave shapes 428, 438 and 450 which are transmitted to the respective output terminals 1 of the three stages. Thus the spike 462 occurring at the time 15 "flips over" the first and third stage as indicated in the wave shape 428 and 450, but is of no effect as regards the second stage which prior to the time 15 had been in its usual condition.

At the time 16 a dash pulse similar to the pulse 160 in wave train 112 but reversed in polarity commences and is transmitted over interconnection 2302 to the set input terminal S of the first stage 390 and gives rise at the time 16 to the negative spike 464 in wave train 418 and at the time 19 to the positive spike 466. The negative spike 464 is effective to "flip over" stage 390 thereby producing the positive pulse 468 in pulse train 428. A pulse similar to pulse 468 but of opposite polarity is fed from the output terminal 0 of stage 390 to the set input termnial S of stage 392 and is differentiated by capacitor 428', producing the negative spike 470 in wave train 430 at the time 16, which "flips over" the second stage producing the positive pulse 472 in wave shape 438. A pulse similar to the pulse 472 but of opposite polarity is fed from the output terminal 0 of the second stage to the set input terminal S of the third stage and produces the negative spike 474 in wave train 446 at the time 16. The spike 474 is effective to "flip over" the third stage producing the positive pulse 476 in the pulse train 450.

Thus it is seen that at the time 15 the three stages has been reset to the count 0 by the reset spike 462 and at the time 16 they are set to the count 1 owing to the arrival of the spike 464. More generally, prior to the commencement of the first character of a letter the three stages will be reset to 0 and at the commencement of the first character of such letter they will be set to 1.

The positive spike 466 occurring at the time 19 and (corresponding to the end of the dash pulse 160), is ineffective to trigger the stage 390 and therefore the positive pulses 468, 472 and 476 continue beyond the time 19. At the time 20 the second character of the letter X, namely a dot commences. This gives rise to a negative spike in the wave train 418 which reverts the stage 390 to its usual condition once more, thus terminating the positive pulse 468 in train 428 and commencing the negative pulse 477. However the consequential differentiated spike in the train 430 is now positive and as such is ineffective to "flip over" the second stage so that the pulse 472 in train 438 and consequently also the pulse 476 in the train 450 continue beyond the time 20. The termination of the dot at the time 21 produces a positive spike at the junction point 412 which is incapable to flip over the first stage; the stages remain in the conditions as at time 20. The next alternation of states of the stage 390 does not occur until commencement of the second dot of the letter X at the time 22. At such time a negative spike in the train 418 is produced and effects termination of the negative pulse 477 and initiation of the positive pulse 478 in pulse train 428. The flipping of the first stage produces a negative spike in the pulse train 430 which flips over the second stage thereby terminating the positive pulse 472 and commencing the negative pulse 482 in pulse train 438. The flipping of the second stage results in a positive spike in the train 446 at the time 22 which is ineffective to flip over the third stage so that the pulse 476 continues beyond the time 22. The termination of the second dot at the time 23 produces a positive spike (train 418) at the junction 412 which is ineffective to flip over the first stage so that the pulse 478 continues beyond the time 23 as do the pulses 482 and 476. At the time 24 the fourth character of the letter X, namely a dash, commences giving rise to a negative spike in the train 418 which flips over the first stage thereby terminating the positive pulse 478 in the train 428 and commencing the negative pulse 468 therein. The flipping of the first stage produces a positive spike in the train 430 which is ineffective to flip over second stage so that the pulses 482 and 476 continue beyond the time 24. At the time 27 the dash terminates, producing the positive spike 488 in the train 418. This is ineffective to flip over the first stage so that the pulses 486, 482 and 476 continue beyond the time 27. At the time 28 the pulse 489 in pulse train 112 is produced. It is of dot duration, corresponding to the fifth long space count of the letter X, and gives rise to a negative spike in wave train 418 which "flips over" the first stage thereby terminating the negative pulse 486 and commencing the positive pulse 492 in the pulse train 428. The flipping of the first stage gives rise to a negative spike in the train 430 at the time 28, which produces flipping action of the second stage thereby terminating the negative pulse 482 and commencing the positive pulse 496, which in turn produces a negative spike in wave train 446 (time 28), which is effective to flip over the third stage thereby terminating the positive pulse 476 and commencing the negative pulse 500.

At the time 29 the pulse 489 (train 112) terminates and this gives rise to a positive spike in the train 418 at time 29 which as such is ineffective to produce flipping action; however the counter 126 is reset at the time 29. The space trigger 188 at the time 27 began generating a positive pulse corresponding to the negative pulse 501 in train 120; the pulse 501 terminates at the time 29 responsive to termination of the pulse 489. It is differentiated by capacitor 452 and resistor 454 and as differentiated applied to diode 455, which at the time 27 blocks the positive spike, but at the time 29 transmits the negative reset spike 502 in train 460 to the reset input terminals R of the three stages, thence through the respective blocking diodes 456, 457 and 458 to the respective grids. The reset spike 502 in this instance resets the first and second stages, thereby terminating the positive pulses 492 and 496, but does not affect the third stage which had been in its usual condition so that negative pulse 500 continues beyond the time 29. The three stages are now reset to the usual conditions in readiness for the letter E. The flipping of the first and second stages due to the reset trigger spike 502 at the time 29 produces concurrent positive differentiated spikes in the wave trains 430 and 446, which of course are of no effect.

To summarize the operation of the binary character counter 126, the three stages are in their usual condition upon resetting thereof; at the beginning of the first intelligence character of a letter they are in the "unusual" condition. They experience no change in state at the end of the first intelligence character; at the beginning of the second intelligence character the first stage reverts back to the usual condition whereas the second and third stages stay in the unusual condition; no change of state is experienced at the end of the second intelligence character. At the beginning of the third intelligence character the first stage is placed in the unusual condition whereas the second stage reverts back to the usual condition and the third stage remains in the unusual condition; no change in state is experienced at the end of the third intelligence character; at the beginning of the fourth intelligence character the first stage reverts to the usual condition whereas the second and third stages retain their usual and unusual conditions respectively; no change in state is experienced at the end of the fourth intelligence character; at the beginning of the dot pulse which follows the fourth intelligence character the first and second stages are placed in the unusual conditions and the third stage reverts to the usual condition; at the end of such dot pulse the reset pulse arrives and reverts the first and second stage to the usual condition but has no effect on the third stage which already is in the usual condition. The states of the stages are represented more compactly in the following Truth Table wherein the truth values T (True) and F (False) are applied to the proposition that the output terminal 1 of the stage in question is, for the particular count considered, at the higher of its two possible potentials, which is the negation of the proposition that the stage is in its usual condition.

| Count | Stage 1 | Stage 2 | Stage 3 |
|---|---|---|---|
| 0 (Reset) | F | F | F. |
| 1 | T | T | T. |
| 2 | F | T | T. |
| 3 | T | F | T. |
| 4 | F | F | T. |
| 5 | T | T | F. |
| 6 | F | T | F. |
| 7 | T | F | F. |
| 8 or 0 (Reset) | F | F | F. |

The above truth table includes also the counts 6 and 7 for the sake of completeness, although these counts are not ever produced in the keyer. In the case of letters having less than the full four intelligence characters, i.e. less than the full five counts, the advance is directly from the long space count to the reset count. In the case of a two-count letter, for example the letter E as indicated in Fig. 5, with arrival of the reset trigger spike at time 33 following the count 2, only the second and third stages are placed in the usual condition, the first stage having attained it at the time 32, the beginning of count 2. In the case of a three-count letter, such as the letter A as indicated in Fig. 5, with the arrival of the reset spike at the time 15 following the count 3, only the first and third stages are placed in the usual condition, the second stage having attained it at the time 14, the beginning of count 3. In the case of a four-count letter, such as for example the letter I in Fig. 5, with the arrival of the reset trigger spike at the time 7 following the count 4, only the third stage is placed in the usual condition, the first stage having attained it at the time 6, the beginning of count 4, and the second stage having attained it at the time 4, the beginning of count 3. The letter I is composed of two dots and therefore ordinarily of only three counts; the added fourth count arises out of the generation of the five-units-of-time long space previously referred to and discussed more fully hereinafter.

The count pulse trains 127 to 132 are produced responsive to the alternations of states of the three counter stages by means of a well-known diode matrix generally indicated as at 504 in Fig. 3. The matrix is composed of a series of eight horizontal output lines 511 to 518 inclusive which are connected respectively through resistors 521 to 528 inclusive and through a resistor 529 to +250 volts. The units digit for the eight horizontal output lines and eight resistors connected respectively thereto is intended also to signify the associated count output. The counts 6 and 7 of course are not ever produced so that no output connection is provided from the lines 516 and 517. The reset count is produced on line 518 but is not employed externally of the character counter 126, so that no output connection is provided from the line 518. The lines 516, 517 and 518 and the associated resistors and blocking diodes connected thereto have been included for the sake of completeness but could be dispensed with.

Each of the horizontal lines has connected thereto anodes of three blocking diodes identified by a reference numeral whose hundreds digit is five, whose units digit is the same as the horizontal line to which its anode is connected and whose tens digit is respectively in order from left to right 3, 4, 5. The diodes are arranged in six vertical columns each containing four of the diodes. As shown the diodes 552, 554, 556 and 558 have their cathodes connected to the output terminal 0 of the first counter stage 390 through an interconnecting vertical line 570; the diodes 551, 553, 555 and 557 have their cathodes connected to the output terminal 1 of the first counter stage 390 through an interconnecting vertical line 571; the diodes 543, 544, 547 and 548 have their cathodes tied to the output terminal 0 of the second counter stage 392 over a vertical interconnection line 580; the diodes 541, 542, 545 and 546 have their cathodes tied to the output terminal 1 of the second counter stage 392 over a vertical interconnecting line 581; the diodes 535 to 538 inclusive have their cathodes tied to the output terminal 0 of the third counter stage 394 over a vertical interconnecting line 590 and the diodes 531 to 534 inclusive have their cathodes tied to the output terminal 1 of the third stage 394 over a vertical interconnecting line 591.

Each horizontal row of diodes operates in AND circuit fashion, in that the thereto connected horizontal count output line is at the higher potential, if and only if each of the thereto connected vertical lines is at the higher of its two possible potentials. Considering the count 1 output line 511 for example and referring also to the aforegoing truth table, at the count 1 the lines 571, 581 and 591, which are connected respectively to the cathodes of the diodes 551, 541 and 531, are at the higher of two potentials, as signified by the truth value T for each stage. Their anodes are tied to +250 volts through resistors 521 and 529. The potential difference between anode and cathode is small so that the count output line 511 is also at the higher potential. Referring again to the truth table, at the count 2 the line 571 tied to the output terminal 1 of stage 390 is no longer at the higher of its two potentials as signified by the truth value F for stage 1, so that at the count 2 a substantial diode current flows from the +250 volt line through resistor 529 and 521, line 511, diode 551, line 571 to the input terminal 1 of the first stage 390, producing a drop in potential at the diode connected end of resistor 521 so that the line 511 is placed at the lower of its two significant potentials. The fact that the lines 581 and 591 remained at higher potentials as during count 1 does not prevent the drop in potential on line 511. During any of the remaining counts at least one of the three lines 571, 581 and 591 is at the lower of the two possible potentials so that at least one of the three associated diodes 551, 541 and 531 is rendered conductive thereby maintaining the lower potential on the line 511. Slight variations in potential on line 511 may occur depending on whether one, two or all three diodes are conducting but this is of no significance in the operation of the keyer, for as will be recalled the count outputs ultimately either arrive in the encoder at open circuits or are passed therethrough to trigger the dash trigger 161 or the space trigger 175, which are on-off type devices.

The arrangement of the rows and columns of diodes is best explained with reference to the truth table. The generation of the count 1 has been discussed hereinabove. For the count 2 the output terminals 1 of the second and third stage remain at the higher potential whereas the output terminal 1 of the first stage is now at the lower potential, but simultaneously the output terminal 0 of stage 1 is now at the higher potential. Consequently to produce the higher potential signifying the count 2, the diodes 552, 542 and 532, whose anodes are connected to the count line 512, have their cathodes connected respectively to the lines 570, 581 and 591 respectively. It is noted from the truth table that each of these lines is at the higher potential only at the count 2. The connection of the remaining diodes to the vertical lines can be determined practically by inspection from the truth table and Fig. 3, in that where for a given count there appears in the truth table the truth value T, each diode, whose anode is connected to the horizontal line associated with such given count, has its cathode connected to the output terminal 1 of that particular stage, but has its cathode connected to the output terminal 0 of such stage where the truth value in the truth table is F. Thus the diodes whose anodes are connected to the horizontal line 518 associated with the reset count 8 or 0, namely diodes 558, 548 and 538 have their cathodes connected to the output terminals 0 of the first, second and third counter stages respectively inasmuch as the truth table indicates the truth value F for each of these stages.

The count output lines 511 to 514, which carry the counts 1 to 4 respectively as indicated by the pulse trains 127 to 130 inclusive in Fig. 5, constitute together with blocking diodes 601 to 604 the collective output line 157 in Fig. 1 to the commutator 102. The anodes of diodes 601 to 604 are connected to the lines 511 to 514 respectively, and their cathodes are connected to the commutator 102 through the interconnections 2311 to 2314 inclusive. The count output line 515 is connected through a corresponding blocking diode 605 and additional circuitry ultimately to the space trigger 175 over interconnection 2315. The line 515 together with diode 605 and such additional circuitry is represented by the special dot suppress line 158 in Fig. 1. The cathode of diode 604 is connected through the anode and then the cathode of a blocking diode 606 to the cathode of diode 605, so that the count 4 pulses are delivered from the count 4 line 514 to the space return line 158 along with the count 5 pulses from the line 515, as previously indicated.

Referring again to Fig. 2 for resumption of the description of the stepping switch 102, the stationary contacts 201 to 205 (contained in the first five decks 191 to 195 respectively) correspond to the stationary off-position contact 206 in the sixth deck 196. The units' digit is intended to signify the deck number whereas the common tens' digit 0 signifies the 0 or off-position assumed by the stepping switch 102. The parts of the fifth deck are identified by reference numerals having hundreds' and tens' digits the same as the corresponding parts in the sixth deck 196, but have the units' digit of five. As will be seen the fifth deck is utilized to generate sequences of less than four letters. The corresponding parts in the first four decks are identified analogously, with the units' digits 1, 2, 3 and 4 respectively replacing the units' digits 5 and 6 in the fifth and sixth decks respectively, with the exception however that the stationary contacts corresponding to the positions 1 to 4 are represented by interconnections leading to the encoder 159 and bearing reference numerals whose thousands' digit is 2, whose hundreds' digit is 4, whose tens' digit reflects the order of the particular letter transmitted when the rotatable contact engages a stationary contact represented by such interconnection, and whose units' digit reflects the particular count of such letter transmitted over such interconnection. Thus all the parts of the first deck 191 bear a reference numeral whose units digit is 1 and as such are associated with the first deck and also with the first character count. The interconnections of the first deck 191 are, following the off-position contact 201, in order 2411, 2421, 2431 and 2441 to signify transmission to the encoder 159 respectively of the first character count pulse of the letter counts 1, 2, 3 and 4 in the sequence. The remaining decks 192 to 194 are provided with interconnections bearing corresponding reference numerals with the units' digits 2, 3, 4 respectively replacing the units' digit 1 of a corresponding interconnection in the deck 191. The brushes 251*b* to 254*b* are tied respectively to the interconnections 2311 to 2314 to receive in sequence the count pulses from the character counter 126 transmitted thereover.

The stepping switch 102 is provided with an actuator coil 607 which when energized is not immediately effective to advance the rotors of the several decks but does so become effective when deenergized once more. As shown the coil 607 is magnetically and mechanically operatively related to the rotors as indicated generally by the connections 608. The actuator coil 607 is energized initially by the operation of the starting means 100 prior to the transmission of a sequence and thereafter by the positive pulses in a train similar to the pulse train 120 in Fig. 6 but of opposite polarity, which train is delivered from the 1 terminal of the counter 188, as described immediately hereinafter.

The starting means 100 includes a cam 609 which is operated by rotary timing means in the radio navigational aid apparatus external of the keyer at a constant speed of approximately 1/6 r.p.s. The cam is provided with an elevation 610 whose span is approximately 0.083 of the circumference of cam 609. Engagement by the elevation 610 of a cam contact 611, beginning at a preliminary time A (Fig. 6) and continuing for 0.5 second thereafter till the preliminary time B, routes +28 volts from the movable contact 611 to the cooperating stationary contact 612 engaged thereby, and thence over line 613 through the anode and then the cathode of a blocking diode 614 to a junction point 615. The diode 614 provides an input to an OR gate 616 whose other inputs are provided by the diodes 617 and 618. The input of diode 618 had been at the lower potential prior to the time A and may be assumed to remain thereat permanently for present purposes. The input of the diode 617, prior to the time A and thereafter until the time 7, is at the lower of the two significant potentials in view of the connection of its anode to the output terminal 1 of the space counter 188, this being its usual state. Since the line 613 floats prior to the time A the input through diode 614 until the time A is also at the lower of the two potentials or more accurately is not at the higher potential, so that the OR gate 616 is closed prior to the time A. The resultant lower potential of the terminal 615 prior to the time A is transmitted to a thereto connected grid leak resistor 619 whose other end is grounded, and also through a grid current limiting resistor 620 to the grid 621 of a usually non-conducting triode 622. The triode 622 is usually non-conducting in view of the low potential at its grid and the +28 volts potential then prevailing at its cathode. The net negative bias is sufficient to cut the triode 622 off.

The cathode of triode 622 is connected to +28 volts over line 623 and the NC contact 1 of a normally unactivated thermal time delay relay 624, whose movable contact 1 is connected to +28 volts. In the event of activation of the relay 624 the connection to +28 volts is broken with the shift of the movable contact; this, as will be seen, may occur when plate current is flowing through triode 622 in which case the plate current is returned from the cathode to ground over line 623 and a resistor 625. The anode of triode 622 is connected to +250 volts through the coil of a relay 626 whose movable contact 1 is connected to +28 volts and whose NO contact 1 is connected through the heater 627 of the thermal time delay relay 624 and line 628 through the stepping switch actuator coil 607 to ground. The actuator coil 607 is therefore usually deenergized requiring energization of relay 626 and the attendant closure of its NO contact 1 for energization. This occurs initially at the time A with the application of +28 volts from the cam contact 611 to the OR gate 616 which results in conduction of the triode 622. The energization current of the actuator coil passes through the heater 627 of the thermal relay 624, but normally for a period of time insufficient to actuate the relay 624. The relay 624 is provided for the protection of the actuator coil 607; if the actuator coil 607 were energized for too long a period of time resulting in possible damage thereto, the thermal relay 624 is activated, the cathode of triode 622 is disconnected from +28 volts, so that its plate current now passes to ground through resistor 625; such plate current is insufficient to maintain relay 626 energized. As a result the relay 626 releases thereby interrupting the energization circuit for the actuator coil 607 and also for the thermal time delay relay 624 which is therefore deactivated. Since as a result of the deenergization the stepping switch 102 is caused to advance and as a result of the deactivation the cathode of triode 622 is reconnected to +28 volts, it is seen that the protective circuit provided by the relay 624 is self-resetting. In view of the large energization current for the actuator coil 607, which is of the order of 1 ampere, it is necessary to protect the contacts of the relay 626 from current changes of such magnitude and this is accomplished by the provision of a discharge path for such current from line 628 through a resistor 629 and a thereto serially connected capacitor 630 to ground.

Beginning at the time A and terminating at the time B 0.5 second thereafter, the cam contact 611 is closed as previously explained. The resultant voltage on the OR gate input line 613 is illustrated in Fig. 6 by the wave train 631. As a consequence the gate 616 is opened and the actuator coil 607 is energized during this time interval. The OR gate output and concurrent energization are illustrated in Fig. 6 in the pulse train 632 by the positive pulse 633. At the time B the cam contact 611 is disconnected, closing the gate 616 once more and deenergizing the actuator coil 607, terminating the positive pulse 633 and commencing the negative pulse 634. After a short time delay due to the finite time of stepping switch response the movable contacts of the stepping switch 102 are disconnected from their respective off-position contacts. This event occurs at the time C, approximately one dot unit of time (0.1 second) before the time 0. This disconnects the −28 volts from the grid 262 of the usually non-conducting triode 264 of the multivibrator 104; however an inversion of the states of its triodes cannot take place and the initial pulse 274 in the train 106 cannot be produced until at the time 0 the multivibrator capacitor 273 has charged the thereto connected grid 262 to a voltage just above cut-off of the triode 264. The capacitor 273 interconnects grid 262 and the anode 272 of the usually conducting triode 266. The disconnection of the −28 volt blocking voltage at the time C is at least as effective as an inversion of the states at the time C, had the multivibrator been running freely prior thereto, in which case the next inversion could not occur until the time 0, i.e. one unit of time later, Prior to the time 0 however the stepping switch 102 has advanced (counterclockwise as represented in Fig. 2) to its letter count 1 position ready to transmit the initial count pulse of the first letter I. The fact of advance of the stepping switch 102 in less than one unit of time subsequent to the disconnection of the −28 volt blocking voltage, and the further fact of impossibility of multivibrator state inversion until at least such unit of time has elapsed, are availed of in the generation of sequences of fewer than four letters as explained hereinafter.

Beginning with the completion of the advance of the stepping switch 102 the four count outputs are connected to the interconnections 2411 to 2414 ultimately to the encoder 159 over interconnections 2311 to 2314, the wipers **251*b* to 254*b*, the slip rings 251*a* to 254*a* and the rotatable contacts 251 to 254 respectively. The count pulses are transmitted in succession over interconnections 2411, 2412** etc. up to and including the long space count pulse.

Beginning at the time 3 the space counter 188 delivers at its 0 output terminal the negative pulse 635' in train 120 and at its 1 output terminal a similar pulse but of opposite positive polarity. The latter pulse is applied through diode 617 to the OR gate 616 reopening the gate to reenergize the stepping switch actuator coil 607 as reflected by the termination of the negative pulse 634 and the commencement of the positive pulse 636 in the train 632. Beginning with the time B, the pulse train 632 reflects also the potential of the 1 terminal of the space counter 188 in addition to reflecting the voltage at the output of OR gate 616 and the state of stepper coil 607, as the positive voltage at the 1 terminal will be the sole agency for opening the gate from here on until six seconds after the time A, when the entire operation of the keyer is recycled.

At the time 7 the positive space counter pulse 636 ceases, the stepper coil 607 is deenergized and thereafter the stepping switch 102 advances to its letter 2 position, the advance being completed before the time 8, i.e. the commencement of the initial dot of the letter A. The four count output interconnections 2311 to 2314 are now connected to the outgoing interconnections 2421 to 2424 respectively, which lead to the encoding devices for the characters of the second letter respectively. In similar manner the stepper coil 607 is reenergized: beginninng at the time 13 and continuing thereafter until the time 15 by the positive pulse 637 in the pulse train 632, whereafter the stepping switch 102 advances for transmission of the counts of the third letter in the sequence to the encoder 159; beginning again at the time 27 and terminating at the time 29 by the pulse 638 in the train 632 whereafter the stepping switch advances to the letter 4 position wherein the counts of the fourth letter in the sequence are transmitted to the encoder 159; and beginning again at the time 31 and terminating at the time 33 by the positive pulse 639 in the train 632 whereafter the stepping switch 102 advances to its off-position, reapplying −28 volts from the contact 206 over the rotatable contact 256, the slip ring 265*a*, brush 265*b*, interconnection 2202 through diode 260 to the grid 262 of the usually non-conducting triode 264 of the time base generator 104 to inhibit square wave generation once more.

Referring to Fig. 4, the encoder or memory 159 includes a series of rotary wafer switches indicated as at 710, 720, 730 and 740, which are respectively associated with the letter counts 1, 2, 3 and 4 in the sequence, as signified by the tens digit in the respective reference numeral. Each of the switches is composed of four wafers; the wafers are identified by reference numerals whose hundred digit is 7, whose tens digit is the same as that of the associated switch and therefore identifies the letter count associated with the particular wafer, and whose units digit identifies the character count with which the particular wafer is associated. Each wafer is provided with a plurality of angularly equi-spaced stationary contacts identified by the particular letter *a* character of which is encoded by the given contact. Each wafer is also provided with a rotatable contact which in its traverse engages in sequence the stationary alphabet contacts and which is connected to a slip ring which in turn continuously engages a wiper. The rotatable contact, slip ring and wiper of a given wafer are identified by a reference numeral which is the same as that of the associated wafer but is followed by the letters *a*, *b* and *c* respectively. The wiper of a given wafer is connected to that interconnection of the 2400 series which has corresponding tens and units digits in its reference numeral. For example the wiper 711*c* associated with the count 1 of the first letter is connected to interconnection 2411. Each wafer, excepting the count 4 wafers 714, 724, 734 and 744, is also provided with an outer dash return wire ring, an intermediate dash and space return ring, and an inner space return wire ring identified by a reference numeral which is the same as that of the associated wafer but is followed by the letters *d*, *e*, and *f* respectively. The movable contacts of each switch are secured to a common shaft (not shown) for setting of the movable contacts by the instructor to the same call-letter contact in each wafer thereof in unison; this is diagrammatically represented by a mechanical connection which is identified by the same reference numeral as that of the associated switch but followed by the letter *a*. As shown the switches are set in order to the letters I, A, X and E for the generation of the sequence heretofore discussed.

Except for the special connections of the contact I the wafers of the switch 710 are connected in a manner which is typical for the corresponding wafers of the remaining switches. In the wafer 711 the contacts of letters having an initial dot not followed by a long space, for example the letter A, are unconnected. The contacts representing letters having an initial dash not followed by a long space, for example the letter B, are connected to the dash return ring 711*d*. The contact of letter E, which has an initial dot followed by a long space, is connected to the space return ring 711*f*, whereas the contact of letter T, which has an initial dash followed by a long space, is connected to the dash and space return ring 711*e*. In the wafer 712 the connection is similar in that the contacts representing letters requiring dots at count 2 not followed by a long space, for example letter B, are unconnected; the contacts representing letters requiring dashes at count 2 not followed by a long space, for example letter G, are connected to the dash ring 712*d*; the contacts of letters requiring a dot at the count 2 followed by a long space at count 3, for example the letter N, are connected to the space return ring 712*f*; and the contacts of letters requiring a dash at the count 2 followed by a long space at count 3, for example the letter M, are connected to the dash and space return ring 712*e*. Additionally the contacts representing letters having a long space count 2, i.e. the contacts E and T are also connected to the inner space return ring 712*f*. The connection of contacts in the third wafer 713 is similar to that of the wafer 712 as regards: lack of connection of dot representing contacts not followed by a long space at count 4 and connection to the space return ring 713*f* where followed by a long space at count 4, connection of the dash representing contacts not followed by a long space at count 4 to the dash ring 713*d* and to the dash and space return ring 713*e* where followed by a long space at count 4, and connection of the long space count representing contacts at count 3 also to the space ring 703*f*. Additionally the contacts of letters having no count 3, namely the letters E and T, are likewise unconnected. In the fourth wafer 714 only a dash return ring 714*d* is provided and the contacts of letters requiring a dash at count 4 are connected thereto; all other contacts are unconnected, the function of the space return ring being assumed by the special space return line 158 as previously explained.

The lack of connection of the I contact in the wafer 711 and its connection to the space return ring 712*f* in wafer 712 is typical also for the corresponding wafers in the remaining switches, as the first two intelligence characters of the letter I are dots. The I contact of the wafers 723, 733 and 743 is connected to the appropriate space return ring as the letter I is composed of no more than two dots. Because of the generation of a five-units-of-time long space following the second dot of the letter I in ILS transmission, the third I contact in switch 710 is atypically unconnected.

The sixteen dash rings are tied together and as such form the dash return line 161′ which is brought out to an interconnection 2445 leading ultimately to the dash trigger 161; line 161′ may be traced from the V contact of wafer 744 to the J contact and then the V contact of wafer 734, thence to the J contact and then the V contact of wafer 724, thence to the J contact of wafer 714 and also to the P contact and then the C contact of wafer 713, thence to the O contact of wafer 712, from whose G and L contacts two branch connections are provided. The branch path from the G contact of wafer 712 is to the 0 contact of the wafer 711, whereas the path from its L contact is to the R contact and then to both the L and G contacts of wafer 722. The path continues from the G contact of wafer 722 to the 0 contact of wafer 721, and from its L contact to the R contact of wafer 732, from which it continues in turn through its G contact to the O contact of wafer 731 and also through its L contact to the R contact and then to the G and L contacts of wafer 742. The G contact of wafer 742 is connected to the O contact of wafer 741, whereas its L contact is connected through the F contact and then the J contact of wafer 743 to the P contact of wafer 733, also to the J contact of wafer 723, and also to interconnection 2445.

Conductor connection of the dash rings, and similarly of the space rings and of the dash and space rings is permissible without producing cross-talk at the character counter 126 in view of the previously referred to insertion of the blocking diodes 601 to 606 in the output lines of the character counter.

The twelve space rings are tied together and as such from the main space return line 174 which is brought out to an interconnection 2446 leading ultimately to the space trigger 188; line 174 may be traced as interconnecting the E contacts of the wafers 711, 721, 731 and 741; also from the E contact of wafer 711 to the T contact of wafer 722 and the I contact of wafer 712. The further path from wafer 722 is from its I contact to the T contact and then the I contact of wafer 732 and thence to the T contact of wafer 742. The further path from the wafer 712 is from its T contact to the A contact and then the M contact of wafer 713, thence to the interconnection 2446 and also to the N contact and then the I contact of wafer 723, through the A contact and then the M contact of wafer 733 to the N contact of wafer 743.

The twelve dash and space rings are tied together to form a dash and space return line 745 which is connected through the anode and then the cathode of a blocking diode 746 to the A contact of wafer 733 and thence ultimately to the space return interconnection 2446, and is also connected through the anode and then the cathode of a blocking diode 747 to the F contact of wafer 743 ultimately to the dash return interconnection 2445. Line 745 may be traced from the T contact of wafer 711 to the A contact and then the M contact of wafer 712 and thence simultaneously to the K contact of wafer 713, the W contact of wafer 723, the K contact of wafer 733, the W contact of wafer 743, and the M contacts of the wafers 722, 732, and 742, from which it continues over their respective A contacts to the T contacts of the wafers 721, 731 and 741 respectively.

Thus it is seen that the dot count 1 pulses of letters having more than one intelligence characters find open circuits in the encoder 159, as do also the dot count 2 pulses of letters having more than two intelligence characters, and the dot count 3 and 4 pulses of letters having the full four intelligence characters. The dash count 1 pulses of letters having more than one intelligence characters, the dash count 2 pulses of letters having more than two intelligence characters, and the dash count 3 and 4 pulses of letters having the full four intelligence characters are routed to the dash return interconnection 2445. The dot count 1 and 2 pulses of letters having respectively one and two intelligence characters are routed to the space return interconnection 2446, as are also the long space count 2 and 3 pulses and the count 3 dot pulses of letters having three intelligence characters. The dash count pulses occurring at the counts 1, 2 and 3 of letters having respectively one, two and three intelligence characters are routed over the dash and space return line 745 simultaneously to the dash return interconnection 2445 and the space return interconnection 2446.

In the foregoing description it had been assumed that the count pulses arriving at the encoder 159 and also the pulses transmitted directly to the space trigger 175 over interconnection 2315 were exactly coinitial with the corresponding pulses in the multivibrator train 106 and the character trigger train 112 from which they are derived. Actually there is an inherent system delay in the generation of the count pulses, due especially to the finite switching time of the various stages in the character counter 126. The time delay is small, of the order of microseconds, and has been ignored heretofore in the representation of the count pulses, but it can not be ignored in considering the generation of the output pulse trains 165 and 184 of the dash and space triggers 161 and 175 respectively. For this reason the delay in the pulses of trains 162 and 182 which represent the voltages at the dash return and space returns respectively, has been deliberately exaggerated. For example, the initial pulse 181 in the train 162 is shown to commence at the time 10+ and to terminate at the time 14+. The pulse 180 in the train 182 is shown to commence at the time 10+ and to terminate at the time 15+.

The dash count pulses in the train 162 are fed from the encoder 159 over interconnection 2445 to the cathode of a diode 748 which provides an input to an AND gate 749, the other input thereto being provided by a diode 750 whose cathode is tied through line 751 to the output junction point 282 of the time base generator 104. The quiescent level at the output of the gate 749 is established by the division down from +250 volts by the resistors 752' and 753' which are connected respectively from +250 volts to the junction of diodes 748 and 750 and from the cathode of diode 748 to ground. The gate 749 is usually closed in view of the usual lower potential prevailing at junction point 282 and also at the dash return. Even during the time intervals between the even numbered and the odd numbered times, at which the potential at junction 282 rises to the higher potential, the gate remains closed until a dash count pulse arrives at the other input thereof. This occurs initially at the time 10+, the pulse 181 in the train 162 being delayed from its originating positive multivibrator pulse 116 which had commenced at the time 10.

The output of gate 749 is applied to the IN terminal of the dash trigger 161 whose negative B output is applied to the S terminal of the dash counter 168. If the gate 749 were provided with no further delay circuitry, the resultant output at the negative B terminal of the trigger 161 would be reflected by the pulse train 752 in Fig. 6. At the time 10+ the gate would open to result in the negative pulse 753 at the negative B output terminal of the trigger 161. At the time 11 the gate closes once more due to the termination of the positive pulse 116 in the multivibrator pulse train 106. The pulse 181 as shown continues until the time 14+. As a consequence the gate is closed again until the time 12 when the positive multivibrator pulse 117 commences to reopen the gate, giving rise to the negative pulse 754 in the train 752. At the time 13 the multivibrator pulse 117 terminates closing the gate once more until the time 14, at which time it is reopened by the arrival of the positive multivibrator pulse 755 in the train 106, resulting in the negative pulse 756 in train 752, and remains open until the time 14+, at which time it is closed by the termination of the dash count pulse 181. Thus it is seen that three negative dash trigger output pulses would be produced namely the pulses 753, 754 and 756. The leading edges of the first two pulses, 753 and 754 would correctly trigger the dash counter 168 to cause generation of the dot bridging pulse 114; however the leading edge of the last pulse 756 at the time 14 would falsely trigger the dash counter 168 to produce an additional unwanted dot bridging pulse.

To suppress the third, false pulse delay circuitry is provided at the output of the gate 749 and includes a capacitor 757 which is connected from the output of gate 749 to ground and cooperates with the resistor 752' to produce the proper delay. The actual wave shape appearing at the gate output is illustrated in Fig. 6 as at 758. Opening of the gate at the time 10+ does not result in an instant voltage rise but rather in the exponential rise of the positive pulse 759 in the train 758 as shown. On the other hand closure of the gate at the time 11 results in a substantially instantaneous drop of the pulse 759. This is so because the capacitor 757 charges from its quiescent potential through the high resistance of resistor 752' but discharges to the lower potential at junction point 282 through the low forward resistance of diode 750 in this instance and also at the time 13, and through the low forward resistance of diode 748 to the lower potential of interconnection 2445 at the time 14+.

In similar manner the pulses 760 and 761 are produced in the train 758 commencing with exponential rises at the times 12 and 14 respectively and terminating with sharp drops at the closure of the gate 749 at the times 13 and 14+ respectively. The minimum amplitude of the pulses in the train 758 requisite for triggering the dash trigger 161 is indicated at the pulse train 758 by the horizontal line 762 and as shown is attained and passed by the pulses 759 and 760 respectively at the times 10++ and 12++ to trigger the dash trigger 161 and initiate at its negative B terminal the negative pulses 762' and 763 respectively. The pulses 762' and 763 are co-terminal with the pulses 759 and 760 respectively. On the other hand the pulse 761 does not ever attain the threshold trigger voltage represented by the horizontal line 762 in view of its early termination at the time 14+ by the closure of gate 749. As a result the third, false negative dash trigger pulse is not generated. The pulses in the train 165 are differentiated within the dash counter as indicated by the wave train 764 in Fig. 6; the negative spikes 765 and 766 in train 764 are effective at the times 10++ and 12++ to flip the dash counter 168 over, thereby respectively commencing and terminating the pulse 114 in the train 113 at the 1 input terminal of the dash counter 168. The pulse 114 as well as the other similarly generated dot bridging pulses in the train 113 are fed from the 1 terminal of counter 168 through the level dropping resistor 322 to the OR gate 318 to produce the dashes in combination with the positive pulses in the multivibrator pulse train 106.

The space return interconnection 2446 is connected to the anode of a diode 767 which forms an input to an OR gate 768 whose other input is provided by a diode 769. The count 5 special space return interconnection 2315 is connected to the anode of diode 769. The usual potentials at each of the five count outputs is the lower possible potential and therefore the gate 768 is usually closed. The gate is opened, for example by the arrival at the time 10, more accurately 10+, of the count 2 pulse 136 over interconnection 2446 to give rise to the pulse 180 in the train 182. Although the pulse 136 terminates at the time 14, more accurately 14+, the pulse 180 is kept alive by the concurrent arrival of the count 3 long space count pulse 138 which terminates at the time 15+.

The output of gate 768 is connected through a level establishing resistor 770 to ground and also to the cathode of a diode 771 which forms an input to an AND gate 772, the other input thereto being provided by the diode 773 whose cathode is connected to the negative A terminal of the character trigger 110. The output of gate 772 is connected to the IN terminal of the space trigger 175 whose negative B terminal is tied to the S terminal of the space counter 188. Although the input to the gate through diode 771 is at the higher potential at the time 10+, the other input thereto through diode 773 is not at the higher potential until the termination of the dash pulse 118 and the commencement, at the time 13, of the short space pulse 124 in the train 112. It will be recalled that the pulse train at the negative A terminal of the dash trigger 110 is of opposite polarity to that of the train 112. Closure of the gate is reflected by the termination of the positive pulse 185 and the commencement of the negative pulse 183 in the train 184 which represents the output of the trigger 175 at its negative B terminal. The pulse 124 terminates at the time 14 closing the gate once more to terminate the negative pulse 183 and commence the positive pulse 186 in the train 184; the pulse 186 is terminated by the reopening of the gate at the time 15 due to the termination of the pulse 123 and the commencement of the pulse 125. At the time 15+ the gate is closed once more due to the termination of the pulse 180 thereby terminating the negative pulse 187. The pulse train 184 is differentiated within the counter 188 as indicated in the wave train 774 in Fig. 6; the negative spikes 775 and 776 therein, which correspond to the leading edges of the pulses 183 and 187 are effective to flip over the counter 188 whereas the positive spikes in the train 774 are ineffective. The pulse 187 is terminated almost immediately, i.e. at the time 15+, taking advantage of the inherent system time delay.

Responsive to the negative spikes 775 and 776 the space counter 188 at its negative 0 terminal produces the negative pulse 122 (train 120) which commences at the time 13 and terminates at the time 15. The pulse 122 is transmitted over resistor 351 to the AND gate 349 thereby suppressing from transmission to the final output the pulse 123 in the train 112. As previously stated the pulse 637 (train 632) which is coextensive with pulse 122 (train 120) but of opposite, positive polarity, is transmitted to the character counter 126 over interconnection 2304 and also to the OR gate 616; it is effective to energize the actuator coil 607 to prepare the stepping switch 102 for advance; this occurs upon termination of the pulse 637, i.e. subsequent to the time 15 but prior to commencement of the count 1 pulse 146 at the time 16. The pulse 637 is differentiated at the character counter 126 (Fig. 3); the resulting positive spike corresponding to the leading edge of the pulse 637 is blocked by diode 455, whereas the negative spike 462 corresponding to the trailing edge of the pulse 637 is transmitted thereby, whereupon the character counter 126 is reset.

It will be recalled that at the time A the actuator coil 607 was initially energized, that at the time B it was deenergized again, and that therefore at the time O the rotatable contacts 251 to 256 of the stepping switch 102 were disconnected from their respective off-position contacts 201 to 206. As a result the time base generator 104 begins to run freely as indicated by the pulse train 106 in Fig. 5.

The initial positive pulse 274 corresponding to the first intelligence character in the letter I is produced in the train 106, and is fed through the OR gate 318 (Fig. 2) to the character trigger 110 to give rise to the corresponding pulse 842 in the train 112. With the arrival of the pulse 274 the input to the OR gate 318 through diode 314 is placed at the higher potential, the gate is opened, and the trigger 110 flips over to place the input to the AND gate 349 through diode 345 at the higher potential. Since the other input is at its higher potential the gate 349 is opened, the triode 365 conducts and the final output relay 370 is energized. An advance pulse similar to the pulse 842 but of opposite polarity is fed from the negative B output of trigger 380 over interconnection 2302 to the S terminal of the first stage 390 of the character counter 126, flipping the three stages over as indicated by the coinitial pulses 843, 844 and 845 in the trains 428, 438 and 450 respectively, as a result of which the coinitial count 1 pulse 635 in the pulse train 127 is produced by counter 126. As yet none of the pulses 842, 843 and and 635 "know" their prospective durations. The count pulse 635 is delivered over interconnection 2311 to the rotatable contact 251 of the commutator 102, thence over interconnection 2411 to the I contact of the wafer 711 and finds an open circuit there. As a result the pulse 842 and also the corresponding pulse 847 in the final output train remain dot pulses; the pulses 843 and 635 will be of dot count duration until terminated by the second positive pulse 848 in the train 112. The audio tone from oscillator 121 is keyed by the dot pulse and as such is fed over the final output line 378 to the earphones of the student pilot.

At the time 1 the free-running multivibrator terminates its positive pulse 274 and commences its negative pulse 276 in the pulse train 106. Since both inputs of the OR gate 318 are now at the lower potential, the gate is closed, the character trigger reverts to its usual condition, the AND gate 349 is also closed, the output relay 370 releases and an interval of silence ensues from the time 1 to the time 2. A similar but positive pulse is delivered to the S terminal of the counter stage 390 but is of course ineffective to flip over the stage or any other stage.

At the time 2 another positive pulse 849 is generated by the multivibrator 104 and gives rise to the pulse 848 in the train 112. The stage 390 of the character counter is flipped over terminating the positive pulse 843 and commencing the negative pulse 850, but the other stages of the counter are unaffected. The count 1 pulse 635 is terminated and the count 2 pulse 851 begins. It is transmitted over interconnections 2312, 2412 to the I contact of the wafer 712, thence over the space return interconnection 2446 through the OR gate 768 to the AND gate 772 in the form of pulse 852 in the train 182. The gate 772 is as yet closed. No dash having been found in the encoder, the pulse 848 and also the corresponding pulse 853 in the train 108 remain dot pulses and a dot-keyed audio tone is transmitted to the student pilot.

The pulses 849, 848 and 853 terminate at the time 3, giving rise to a time interval of silence lasting prospectively until at least the beginning of the third positive pulse 856 in the train 106, time 4. Termination of pulse 848 effects closure of the AND gate 772, and commencement of the negative space trigger pulse 854 in train 184, which in turn effects initiation of the negative pulse 635 in the train 120, which will be effective to continue the silence interval beyond the time 4. The concurrent positive pulse 636 (train 632) commences, and the actuator coil 607 is energized. The pulse 856 gives rise to the coinitial pulse 857 in the train 112. Concurrently the negative pulse 850 in the train 428 is terminated and the positive pulse 858 therein commences. The counter stage 390 experiences its second (even-numbered) alternation so that concurrently the second counter stage 392 is also flipped over, terminating the positive pulse 844 and commencing the negative pulse 860 in the train 438. At time 4, more accurately 4+, the count 2 pulse 851 and the space trigger pulse 854 are also terminated and the count 3 pulse 861 commences. It is transmitted over interconnections 2313 and 2413 to the I contact of the wafer 713, where it finds an open circuit. The space counter pulse 635 is still alive and thereforce continues to close the AND gate 349 and the silence interval. At the time 5 the pulses 856 and 857 terminate, thereby continuing closure of the AND gate 349 prospectively at least until the time 6, at which time the fourth positive pulse 862 from the multivibrator 104 is generated to give rise to the concurrent pulse 863 in the pulse train 112. Concurrently the first stage 390 of the character counter 126 flips over again, terminating the positive pulse 858 and commencing the negative pulse 864 in the train 428. Concurrently also the count 3 pulse 861 is terminated and the count 4 pulse 865 in the train 130 commences. It is transmitted from the character counter 126 concurrently over interconnections 2314 and 2315. Transmission from interconnection 2314 is continued over the commutator interconnection 2414 to the I contact of the wafer 704 where an open circuit is found, so that the pulse 863 (train 112) remains a dot pulse. Transmission from interconnection 2315 is continued through the OR gate 768 so that the count 4 pulse 865 is inserted in the train 182 in the form of pulse 866, which is transmitted to the AND gate 772, which however remains closed until the termination of the pulse 863 at the time 7. The pulse 635 is therefore kept alive until the time 7, continuing closure of the AND gate 349 and the silence interval prospectively at least until the time 7. Termination of the pulse 863 at the time 7 at once continues closure of gate 349 and the silence interval prospectively until the time 8, and closes the AND gate 772 to commence the negative pulse 867 in the space trigger train 84 which concurrently terminates the space counter pulses 635 and 636. The pulse 636 had been transmitted over interconnection 2304 to the character counter; its trailing edge is transmitted through the R terminals of the counter to reset the counter at the time 7. The pulses 864 and 860 are unaffected as they had been negative prior to the time 7; however the positive pulse 845 is terminated and the negative pulse 868 in train 450 begins at the time 7. Concurrently also the count 4 pulse 865 terminates and the reset count pulse 869 in the train 132 commences. This in turn immediately, at the time 7+, terminates the space trigger pulse 867. It should be recognized that the generation of two space return pulses 852 and 866 rather than a continuous pulse, the separation of the space trigger pulses 854 and 867 by three rather than one unit of time, and the duration of space counter pulse 635 of four rather than two units of time arises out of the atypical manner of encoding the counts 3 and 4 of the letter I to generate the interval of silence which had begun at the time 3 and continues until the time 8.

The termination of pulse 636 (train 632) also effects deenergization of the actuator coil 607 at the time 7. As a result the stepping switch 102 advances thereafter to its letter count 2 position. The advance is complete prior to the time 8.

At the time 8 the fifth positive pulse 870 in the train 106 is delivered from the time base generator 104 to the character trigger 110 and gives rise to the pulse 134 in the train 112 at the positive B output terminal thereof. The three character counter stages flip over terminating the negative pulses 864, 860 and 868 in the trains 428, 438 and 450 respectively and commencing the positive pulses 871, 872 and 873 therein. Concurrently the reset count pulse 869 is terminated and the count 1 pulse 135 commences. It is fed from the character counter 126 over interconnections 2311 and 2421 to the A contact of the wafer 721 where it finds an open circuit. Consequently the pulse 134 in train 112 and also the concurrent dot pulse 133 at the output of the long space mixer 119 are unaffected and a dot-keyed tone is fed to the earphones. At the time 9 these pulses terminate and a short space interval of silence ensues, but no changes occur in the character counter until the time 10 when the sixth positive pulse 116 in the train 106 commences. This gives rise (at the output of the character trigger 110) to the coinitial pulse 118 in the train 112. Concurrently the positive pulse 871 in the train 428 of the first character counter stage is terminated and the negative pulse 876 commences therein. The other counter stages experience no change in state. The count 1 pulse 135 is terminated and the count 2 pulse 136 commences. It is transmitted from the character counter 126 over interconnections 2312 and 2422 to the A contact of the wafer 722, then over the dash and space return line 745 simultaneously to the dash return interconnection 2445 and the space return interconnection 2446. It is transmitted from interconnection 2445 in the form of pulse 181 in the train 162 to the dash AND gate 749, opening the gate responsive thereto and to the pulse 116 at the time 10+. The pulse 759 commences with exponential rise, so that the dash trigger negative output pulse 762' does not commence until the time 10++, at which time the dash counter 168 is triggered and delivers the bridging pulse 114 to the character trigger 110, rendering a dash pulse its originating pulse 118 and also the concurrent pulse 137 in the pulse train 108 of the long space mixer 119. The oscillator 121 is keyed for transmission of a dash to the earphones. This also renders the count 2 pulse 136 a dash count pulse keeping the dash return pulse 181 alive until the time 14+. The pulse 136, as transmitted over the space return in the form of pulse 180 in train 182, arrives at the space AND gate 772, but the gate remains closed as yet. The sixth time base generator pulse 116 terminates at the time 11 and the negative pulse 115 in the train 106 commences concurrently. It is suppressed from transmission through the character trigger by the dash pulse 114, but closes the dash AND gate 749, terminating the pulses 759 and 762′. The pulse 114 is kept alive. The negative multivibrator pulse 115 terminates at the time 12 at which time the seventh, positive pulse 117 in the train 106 commences. The dash AND gate is opened again, commencing the pulse 760, and after some delay, at the time 12++ also the dash trigger pulse 763, which in turn terminates the dash counter pulse 114. The pulse 117 keeps alive the dash pulse 118 after the termination of the pulse 114 at the time 12++ and this in turn keeps alive the pulses 180 and 181. At the time 13 the pulse 117 in the train 106 terminates, thereby terminating the dash pulses 118 and 137. This gives rise to a silence interval lasting prospectively at least until the time 14. As a consequence the space AND gate 772 closes, commencing the negative space trigger pulse 183 and the negative and positive space counter pulses 122 and 637. The actuator coil 607 is energized. The pulses 754 and 763 are terminated. The time interval of silence continues.

No changes take place in the character counter until the time 14 when the eighth positive pulse 755 in the train 106 is delivered by the time base generator 104 to the OR gate 318. The pulse 755 gives rise to the concurrent pulse 123 in the train 112 at the positive B output terminal of the character trigger 110. Concurrently the negative pulse 876 in the train 428 of the first character counter stage terminates and the positive pulse 878 therein commences, which in turn terminates the positive pulse 872 concurrently in the second counter stage and commences the negative pulse 880 therein. The count 2 pulse 136 is terminated and the count 3 pulse 138 commences. It is delivered from the character counter 126 over interconnections 2313 and 2423 to the A contact of the wafer 723, then over the space return 2446 to the space OR gate 768 to keep alive the pulse 180. Arrival of the pulse 755 reclosed the dash AND gate 749 to initiate the undesired pulse 761, which is however immediately terminated at the time 14+ without effect on the dash trigger. Commencement of the character trigger pulse 123 also closes the space AND gate 772 terminating the space trigger pulse 183. The space counter pulse 122 is kept alive and as such suppresses from transmission to the final output the pulse 123 and continues the silence interval.

At the time 15 the pulses 755 and 123 terminate and the negative pulse 125 in the train 112 commences. The space AND gate opens once more initiating the negative pulse 187 in the train 184 at the negative B output terminal of the space trigger 175. As a result the space counter pulses 122 and 637 are terminated; the actuator coil 607 is deenergized and the commutator 102 advances to the position in readiness for transmission of the character count pulses of letter count 3, which advance is completed before the commencement of the first such character count pulse at the time 16.

The pulse 637 had been transmitted over interconnection 2304 to the character counter 126 but the transmission of the resultant positive differentiated spike corresponding to the leading edge of pulse 637 at time 13 had been blocked by diode 455. The negative trailing edge is however transmitted to the R terminals of the character counter 126 and as such resets the first and the third stages; the second stage at the time 15 is already in its usual condition and is therefore unaffected. The positive pulses 878 and 873 (in the trains 428 and 450 respectively) terminate and the negative pulses 882 and 884 respectively therein commence. The count 3 pulse 138 terminates and the reset count pulse 144 commences, as a consequence of which the space return pulse 180 terminates reclosing the space AND gate 772 and terminating the space trigger pulse 187 at the time 15+.

The commencement of the negative pulse 125 in the train 112 had continued the time interval of silence prospectively until the time 16, at which it is terminated by the arrival of the ninth positive multivibrator pulse 166 in the train 106 which gives rise to the coinitial pulse 160 in the character trigger pulse train 112. The three character counter stages flip over, terminating the negative pulses 882, 880 and 884 and commencing the positive pulses 468, 472 and 476 in the trains 428, 438 and 450 respectively. The reset count pulse 144 terminates and the count 1 pulse 146 commences. It is transmitted from the character counter 126 over the stepping switch interconnections 2311 and 2431 to the X contact of the wafer 731, thence in the form of the pulse 163 in the train 162 over the dash return interconnection 2445, where at the time 16+ it opens the dash AND gate 749 to produce at the time 16++ the negative dash trigger pulse 167 whose leading edge advances the dash counter 168. The dash counter delivers the positive pulse 169 in the train 113 to the OR gate 318, keeping this gate open even upon termination of the multivibrator pulse 166 at the time 17; this renders the character trigger pulse 160 and the final output pulse 173 dash pulses. A dash-keyed audio tone is transmitted to the earphones of the student pilot. The count 1 pulse 146 is rendered a dash count pulse. When at the time 17 the multivibrator pulse 166 terminates, the dash AND gate 749 recloses, terminating the dash trigger 167 in the train 165. The dash counter pulse 169 however remains alive and bridges the positive multivibrator pulses 166 and the next, tenth positive multivibrator pulse 171 which commences at the time 18 and terminates at the time 19. The pulse 171 reopens the dash AND gate 749, effecting at the time 18++ initiation of the negative dash trigger pulse 170 in the train 165 which in turn terminates the dash counter pulse 169. The dash pulses 160 and 173 are kept alive until the time 19 by the multivibrator pulse 171.

Upon termination of the pulse 171, the dash trigger pulse 170 terminates and a short space time interval of silence ensues, lasting until the time 20, at which the eleventh positive multivibrator pulse 177 commences giving rise to the coextensive pulses 176 and 178 in the character trigger and final output trains respectively. The first character counter stage flips over, terminating the positive pulse 468 and initiating the negative pulse 477 in the train 428; the remaining stages are unaffected. The false, third dash AND gate pulse 886 commences but is immediately terminated at the time 20+ owing to the termination of the count 1 pulse 146 and the commencement of the count 2 pulse 148. The pulse 148 is transmitted from the character counter 126 over the stepping switch interconnections 2312 and 2432 to the X contact of wafer 732 where it finds an open circuit. As a result the pulses 176 and 178 remain dot pulses and a dot-keyed audio tone is transmitted which terminates at the time 21, whereafter a short space time interval of silence ensues lasting until the time 22.

At the time 22 the twelfth positive multivibrator pulse 888 begins and gives rise to the coextensive pulses 890 and 892 in the character trigger train 112 and the final output train 108 respectively. The first character counter stage flips over terminating the negative pulse 477 and initiating the positive pulse 478 in the train 428, as a result of which the second stage also flips over terminating the positive pulse 472 and initiating the negative pulse 482 in the train 438. The count 2 pulse 148 is terminated and the count 3 pulse 150 commences. It is transmitted from the character counter over the stepping switch interconnections 2313 and 2433 to the X contact of the wafer 733 where it finds an open circuit. As a result the pulses 890 and 892 remain dot pulses, lasting until the termination of the pulse 888 at the time 23. A dot-keyed audio tone is transmitted to the earphones terminating at the time 23 whereafter a short space time interval of silence ensues terminating at the time 24.

At the time 24 the thirteenth positive multivibrator pulse 894 commences in train 106 and gives rise to the coinitial pulses 896 and 898 in the character trigger train 112 and the final output train 108 respectively. The first character counter stage flips over terminating the positive pulse 478 and initiating the negative pulse 486 in the train 428. The count 3 pulse 150 terminates and the count 4 pulse 152 commences. It is transmitted from the character counter 126 over the stepping switch interconnections 2314 and 2434 to the X contact of wafer 734 and also over interconnection 2315 in the form of pulse 900 in train 182 to the space AND gate 772. The gate remains open however, as the other input thereto from the negative A terminal of the character trigger 110 is then at its lower potential. Continuing the transmission of pulse 152 from the X contact of the wafer 734, it is transmitted in the form of pulse 902 in train 162 to the dash return interconnection 2445 to open the dash AND gate 749. Opening of the gate initiates at the time 24++ the negative dash trigger pulse 904, which in turn flips over the dash counter 168 initiating the positive pulse 906 in the train 113 which lasts prospectively until the time 26++ to bridge the pulse 894 and the next, fourteenth positive multivibrator pulse 908. The pulse 894 terminates at the time 25 whereas the pulse 908 commences at the time 26, but the pulses 896 and 898 are kept alive by the dash counter pulse 906 and pulse 908. A dash-keyed audio tone is transmitted to the earphones.

When the pulse 894 terminates at the time 25, the dash AND gate closes once more terminating the dash trigger pulse 904; however the dash counter pulse 906 remains alive. When at the time 26 the pulse 908 (train 106) commences the gate opens once more to effect at the time 26++ initiation of the negative dash trigger pulse 910 which in turn reverts the dash counter 168 to its usual condition, terminating the pulse 906. At the time 27 the pulse 908 terminates as a result of which the pulses 896 and 898 also terminate, so that a time interval of silence ensues, lasting prospectively until at least the time 28. Termination of the pulse 896 at the time 27 opens the space AND gate 772 to initiate the pulse 914 in train 184 at the negative B terminal of the spacer trigger 175. This in turn flips over the space counter 188 initiating the pulse 501 at the 0 terminal theerof and the pulse 638 at the 1 terminal thereof. The pulse 501 is transmitted to the AND gate 349 to continue closure of the gate prospectively until the time 29 at least. Generation of the pulse 638 results in energization of the actuator coil 607 in preparation for advance of the stepping switch 102 upon deenergization. The pulse 638 is also transmitted over interconnection 2304 to the character counter 126 but is as yet of no effect because of the blocking action of the diode 455.

At the time 28 the fifteenth positive multivibrator pulse 916 commences in train 106 and gives rise to the coinitial character trigger pulse 489 and also to the third, false dash AND gate pulse 912 in the train 758. The first character counter stage flips over terminating the negative pulse 486 and initiating the positive pulse 492 in the train 428. As a consequence the second stage also flips over terminating the negative pulse 482 and initiating the positive pulse 496 in the train 438. This in turn flips the third stage over, terminating the positive pulse 476 and initiating the negative pulse 500 in train 450. The count 4 pulse 152 is terminated; consequently the dash return pulse 902 is also terminated at the time 28+, terminating in turn concurrently the false, third dash AND gate pulse 912 so that pulse 912 is ineffective. The count 5 pulse 154 commences. It is transmitted over the space return interconnection 2315 and as such keeps alive the pulse 900. The space AND gate recloses however in view of the generation the character trigger pulse 489. Therefore the space trigger pulse 914 is terminated, but the space counter pulse 501 remains alive and as such suppresses from transmission to the final output the character trigger pulse 489, thus continuing the time interval of silence prospectively at least until the time 29.

At the time 29 the pulse 489 terminates so that the space AND gate 772 reopens. The space trigger 175 delivers from its negative B terminal the pulse 917 which in turn terminates the space counter pulses 501 and 638. The actuator coil 607 is deenergized and the stepping switch 102 advances to the position corresponding to the transmission of letter counter 4; the advance is complete prior to the time 30. Because of the termination of the multivibrator pulse 916 the interval of silence is continued prospectively until the time 30. At the time 29, also as a result of the termination of the pulse 638 the character counter 126 is reset responsive to the trailing edge of the pulse 638. The first stage flips over terminating the positive pulse 492 and initiating the negative pulse 918 in train 428. The second stage also flips over terminating the positive pulse 496 and initiating the negative 919 in the train 438. The third stage is unaffected as it had been in its usual condition prior to the time 29. As a consequence the count 5 pulse 154 is terminated and the reset count pulse 156 commences. As a consequence of the termination of the pulse 154 the space return pulse 900 is also terminated, so that the space AND gate 772 closes, as a consequence of which the space trigger pulse 917 is also terminated at the time 29+.

At the time 30 the sixteenth positive multivibrator pulse 920 is delivered to the character trigger 110 and gives rise to the coextensive pulses 921 and 922 in the train 112 in the final output train 108 respectively. The three counter stages flip over terminating the negative pulses 918, 919 and 500 and initiating the positive pulses 923, 924 and 925 in the trains 428, 438 and 450 respectively. The reset count pulse 156 terminates and the count 1 pulse 926 commences. It is transmitted from the character counter 126 over the stepping switch interconnections 2311 and 2441 to the E contact of the wafer 741 where it finds a path only to the space return interconnection 2446. As a consequence the pulses 921 and 922 remain dot pulses and a dot-keyed audio tone is transmitted to the earphones. The count 1 pulse 926 is transmitted over the space return to the space AND gate in the form of pulse 189 in the train 182. The space AND gate remains closed as yet until the termination of pulse 921. At the time 31 the pulses 920, 921 and 922 terminate, resulting in a silence time interval lasting prospectively at least until the time 32. The space AND gate closes in view of the termination of the pulse 921 resulting in the negative space trigger pulse 927 in the train 184. The space counter 188 flips over and delivers the negative output pulse 928 in train 120 at its 0 output terminal and the positive pulse 639 in the train 632 at its 1 terminal. The pulse 928 is effective to continue the time interval of silence prospectively until the time 33 at least. Arrival of the pulse 639 is effective to energize the actuator coil 607 to prepare the stepping switch 102 to advance to its OFF position upon subsequent deenergization. The pulse 639 is also transmitted to the character counter 126 over interconnection 2304 but is as yet ineffective in view of the blocking action of the diode 455.

At the time 32 the seventeenth positive multivibrator pulse 929 is delivered to the OR gate 318 and gives rise to the coinitial character trigger pulse 930 in the train 112. The first character counter stage flips over terminating the positive pulse 923 in the train 428. The count 1 pulse 926 terminates and the count 2 pulse 931 commences. It is transmitted from the character counter over the commutator interconnections 2312 and 2442 to the E contact of the wafer 742 thence over the space return interconnection 2446 to keep the pulse 189 in train 182 alive. Because of the generation of the pulse 921 the space AND gate 772 closes again, terminating the space trigger pulse 927; the space counter pulse 928 however remains alive. At the time 33 the multivibrator pulse 929 terminates and the character trigger pulse 930 also terminates, continuing the time interval of silence prospectively until the time 34 at least. The space AND gate 772 is reopened initiating the negative space trigger pulse 932 in the train 184. The space counter pulses 928 and 639 terminate, resulting in the deenergization of the actuator coil 607 and resetting of the character counter 126. The positive pulses 924 and 925 in the trains 438 and 450 respectively are terminated, as a consequence of which the count 2 pulse 931 is also terminated and the reset count pulse 933 commences. Termination of the count 2 pulse 931 effects at the time 33+ termination of the space return pulse 189 and the consequent closure of the space AND gate 772. As a result the space trigger pulse 932 also terminates.

As a consequence of the deenergization of the actuator coil 607 the stepping switch 102 advances from its letter count 4 position to its original OFF position. The rotatable contact 256 is reconnected to the stationary contact 206. The —28 volts applied to the contact 206 is routed over interconnection 2202 and diode 260 to the grid 262 of the time base generator 104 to inhibit the running of the time base generator once more. It is seen that the stepping switch 102 and the character counter are reset to readiness for transmission of another sequence of call letters. As a matter of fact the entire apparatus has reverted to the usual condition; the silence interval will continue until 6 seconds subsequent to the time 0. At a time 6 seconds subsequent to the time A the cam 609 will effect engagement of the cam contact 611 once more, and at the time 6 seconds subsequent to the time B such engagement will terminate so that at the time 6 seconds subsequent to the time 0 another sequence will commence.

The stepping switch 102 is provided with a pair of so-called interrupter contacts which cooperate with the actuator coil 607 in the manner of an ordinary relay, and are therefore designated in analogous manner. These contacts 1 and 2 are used for the purpose of DME operation and for generation of sequences of fewer than four letters respectively. As shown the movable contact 1 is connected through interconnection 2204 and level dropping resistor 934 to the grid 364 of the final output tube 365. The NO contact 1 is unconnected, whereas the NC contact 1 is connected to a stationary contact of a single-pole-double-throw switch 935'. The switch 935' in the case of operation other than the DME operation is placed in the position indicated to disconnect from the NC contact 1 of the actuator coil 607. In such case the movable contact 1 floats whether the actuator coil is energized or deenergized and is therefore ineffective to modify the operation of the apparatus.

For purposes of DME operation the switch 935 is placed in the alternate position to connect to the NC contact 1 of the actuator coil 607. The movable contact of the switch 935' is tied through line 936' to the OFF position contact 201 of the first wafer 191 of the stepping switch. Assuming that the switch 935' had been in the alternate position prior to the time A, and recalling that the actuator coil 607 has been deenergized prior to the time A, a continuous audio tone representative of DME operation would have been transmitted to the final output line 378 prior to the time A in the following manner.

The interconnection 2311 is of course permanently connected to the count 1 output of the character counter 126 and had been at the lower possible potential prior to the time A. This potential was routed to the stationary contact 201, thence over line 936', switch 935', the NC contact 1 of the actuator coil 607, interconnection 2204 and resistor 934 to the grid 364 of triode 365. The potential, even though the lower of the possible two, was sufficiently high to render the triode 365 conductive and energize the relay 370 continuously, i.e. until the triode 365 was cut off once more. The tone had been transmitted from the oscillator 121 over the NO contact 1 of relay 372, the NO contact 2 of relay 370, and the NC contact 1 of relay 376 to the output line 378 to the earphones continuously. When at the time A the actuator coil 607 was initially energized the NC contact 1 of the actuator coil 607 opened, so that the application of the voltage from the contact 201 to the grid 364 ceased. This terminated transmission of the DME signal. At the time B the actuator coil 607 was denenergized once more, but the continuous audio tone transmission nevertheless was inhibited owing to the disconnection of the rotatable contact 251 from the stationary contact 201, whereby the contact 201 was caused to float. Transmission of the sequence continued as described previously until subsequent to the time 33 and before the time 34 the stepping switch 102 assumed its off position once more. At that time the interval of silence which had commenced at the time 31 was terminated owing to the reapplication of the character count 1 line lower potential over interconnection 2311, contact 201, line 936, switch 935, the NC contact 1 of actuator coil 607, interconnection 2204 and resistor 934 to the grid 364. This rendered the tube 365 conductive once more, reenergizing the relay 370 and again caused continuous transmission of the audio tone over the NO contact 2 of relay 370. Such transmission continues until at the time 6 seconds subsequent to the time A the actuator coil 607 is energized once more by the closure of the cam contact 611. It is apparent that the operation of the apparatus is cyclical at a 6 seconds' period, whether or not DME operation is selected.

For purposes of generating call letter sequences composed of fewer than four letters there is provided a multiposition shorting type selector switch 935 (Fig. 2) composed of two similar switches 936 and 937 which are operable in unison through corresponding positions as generally indicated by connections 938. The switches as shown are composed of respective elevated portions 939 and 940 and depressed portions 941 and 942. In the indicated position for four letter transmission the elevation 939 engages solely the contact 943 which is energized by +28 volts, and the elevation 940 engages solely the contact 944 which is energized by —28 volts. As illustrated the advance of switch 935 for generation of sequences of fewer than four letters is in the counterclockwise direction. In the next, three-letter position, the elevation 939 engages additionally the contact 945 so that +28 volts is routed from contact 943 over elevation 939 to contact 945 and then to the stepping switch contact 245 connected thereto, whereas the elevation 940 engages additionally the contact 946 to route —28 volts to the stepping switch contact 246. In the next (two-letter) position the elevations 939 and 940 engage respectively the additional contacts 947 and 948. This routes +28 volts and —28 volts additionally to the stepping switch contacts 235 and 236 respectively. In the next (one-letter), position the elevations 939 and 940 engage additionally the contacts 950 and 951 respectively, so that +28 volts and —28 volts are routed additionally to the stepping switch contacts 225 and 226 respectively.

Where a three-letter sequence is desired, the switch 935 is placed in the three letter position, so that +28 volts and —28 volts are applied respectively to the stepping switch contacts 245 and 246. The sequence proceeds as in the case of a four-letter sequence until the advance of the stepping switch from its letter count 3 position to its letter count 4 position. It will be recalled that such advance takes place upon termination of that positive multivibrator pulse delivered to the OR gate 318 which had given rise to the long space count pulse and before the next transmission of a dot or a dash to the earphones, i.e. before the arrival of the next such positive multivibrator pulse.

Upon completion of the advance the rotatable contact 256 engages the stationary contact 246 to route —28 volts over interconnection 2202 through diode 260 to the grid 262 of the then and usually non-conducting triode 264 of the multivibrator 104 to render the triode non-conducting and inhibit square wave generation prospectively until one unit of time subsequent to removal of such inhibiting voltage. At the same time the rotatable contact 255 engages the stationary contact 245 to route +28 volts over the NC contact 2 of the actuator coil 607, lines 952 and 613 to the OR gate 616 to reenergize the actuator coil 607. Its NC contact 2 opens, application of the +28 volts is discontinued, the actuator coil is deenergized, its NC contact 2 closes again and the stepping switch advances from the letter count 4 position to its OFF position in readiness for another sequence. The disconnection of the rotatable contact 256 from the stationary contact 246 discontinued application of the —28 volts multivibrator inhibiting voltage; however the multivibrator cannot emit a dot or dash producing positive pulse until at least one unit of time subsequent thereto as pointed out in the description of the disconnection of the —28 volt inhibiting voltage at the time C. Before the lapse of such one unit of time the advance of the stepping switch 102 to its OFF position is complete and the —28 volts are reapplied, but now from the stationary contact 206.

In the case of generation of a two-letter sequence the switch 935 is placed in its two-letter position wherein +28 volts is applied to both contacts 245 and 235 and —28 volts is applied to both contacts 246 and 236. The sequence proceeds as previously described until the stepping switch advances from its letter count 2 position to the letter count 3 position. Upon completion of the advance the rotatable contact 256 engages the stationary contact 236 to route —28 volts to the multivibrator 104, thereby blocking its square wave generation. Also the rotatable contact 255 engages the stationary contact 235 to route +28 volts over the NC contact 2 of the actuator coil 607 to the OR gate 616 to reenergize the actuator coil, whereupon its NC contact 2 opens to deenergize the actuator coil once more. The stepping switch advances to its letter count 4 position before another dot or dash producing multivibrator pulse can be emitted. Thereafter the stepping switch advances to its OFF position in the same manner as in the case of generation of a three-letter sequence.

In the case of transmission of a one-letter sequence, such as is employed in marker or beacon operation, the switch 935 is placed in its one-letter position wherein +28 volts is applied to the three contacts 225, 235 and 245 and wherein —28 volts is applied to the three contacts 226, 236 and 246. The operation proceeds as previously described until the stepping switch advances from its letter count 1 to its letter count 2 position. Upon completion of such advance the rotatable contact 256 engages the stationary contact 226 to apply the —28 volts inhibiting voltage to the multivibrator. At the same time the rotatable contact 255 engages the stationary contact 225 to apply +28 volts over the NC2 of the actuator coil 607 to the OR gate 616, causing the actuator coil 607 to be energized. Its NC contact 2 opens, discontinuing application of +28 volts to the OR gate 616 and deenergizing the actuator coil 607 once more, whereupon the stepping switch 102 advances to its letter count 3 position before another dot or dash producing positive multivibrator pulse can be generated. Thereafter the sequence proceeds as in the case of a two-letter sequence. Thus the stepping switch in the case of transmission of a sequence composed of fewer than four call letters is caused after transmission of the last letter to home in on its OFF-position past the positions of any intervening unused letter counts.

The stepping switch wafers have been represented as containing five contacts for simplicity; they are generally commercially provided with more than five contacts. Where the number of contacts is a multiple of five, it is merely necessary to tie together each of the first five contacts with the contact or contacts separated therefrom by five contacts of multiples of five contacts. If the stepping switch is provided with a number of contacts not a multiple of five, the arrangement is the same until all the contacts up to and including the last multiple of five are properly connected. The remaining contacts of the fifth wafer 195 are tied to +28 volts and those of the sixth wafer 196 are tied to —28 volts, to achieve the above-described homing effect.

As previously stated, no means are included to assure, when power is initially turned on, that the apparatus be placed in its usual condition. As a consequence the first sequence of transmitted letters may be false or incomplete, but at the end of such sequence the apparatus is properly inherently reset in readiness for subsequent transmission of a correct and complete sequence. When power is initially turned on the setting of the counters and of the stepping switch may be random. In the absence of the additional circuitry provided, there would exist several combinations of random settings which would preclude initiation even of a false or incomplete sequence, as a result of which a complete or correct sequence could not ever be generated.

For example the dash counter 168 may initially be improperly set to its "unusual" state before the initiation of the sequence by the cam 100. This opens the OR gate 318, places the dash trigger 110 in its unusual condition, which in turn opens the AND gate 349, assuming that the space counter 188 is set to its usual condition, and therefore effects energization of the final output relay 370, which thus transmits a continuous tone. In the absence of any protective means such tone would be transmitted continuously even upon initiation of the sequence by the cam 609. The first positive multivibrator pulse would arrive at the OR gate 318 at the time 0, find it open already and therefore would not change the state of the character trigger tubes. As a result the character counter would not advance, and if it had been prior to the time 0 properly set to its usual condition, i.e. the reset count, no count pulse would be applied to any of the stepping switch interconnections 2311 to 2314; consequently no count pulses could be transmitted to the encoder 159; no higher potential pulses would ever arrive at the dash return interconnection 2445 or the space return interconnections 2315 or 2446, the dash AND gate 749 would remain closed, the dash trigger 161 could not experience a change of state and therefore the dash counter 168 could not experience a change of state, maintaining the OR gate 318 open and continuing continuous tone transmission even upon termination of the first and the subsequent positive multivibrator pulses.

Similarly, the space AND gate 772 would remain closed, the space trigger 175 could not experience a change of state and consequently the space counter 188 could not experience a change of state so that the AND gate 349 would remain open to continue transmission of the continuous audio tone. The 1 terminal of the space counter 188 would remain at its lower potential so that the actuator coil 607 could not be energized preparatory to an advance of the stepping switch, as a result of which transmission of the audio tone would continue indefinitely.

To avoid such a situation the end of resistor 322 which is connected to the anode of diode 320 forming an input to the OR gate 318, is also connected over line 954 through the anode and then the cathode of a blocking diode 956 to the cathode of diode 748 which forms an input to the dash AND gate 749. If the dash counter 168 assumes its unusual condition upon initial application of power, the resultant higher potential at its 1 terminal is transmitted through resistor 322, line 954 and diode 956 to the dash AND gate 749; when the first positive multivibrator pulse arrives at the gate 749, the conditions for AND circuit operation are satisfied, the gate opens, and the dash trigger 168 experiences an alternation of states, as a result of which the dash counter 161 is placed in its usual condition. At the termination of the first positive multivibrator pulse the OR gate 318 closes terminating transmission of the continuous tone. Transmission of a false or incomplete sequence may proceed, but the next sequence will be inherently correct and complete. The dash counter 168 will inherently be properly reset in view of the generation of two negative pulses at the negative B terminal of the dash trigger 161 for each generated dash. The diode 956 will contribute nothing further to the operation of the apparatus; the dash counter 168 will transmit the dash producing positive pulses from its 1 terminal also through diode 956 to the dash AND gate 749; but the initiation of these pulses is due to the arrival at the dash return interconnection 2445 of a positive pulse in the train 162, opening the dash AND gate. The superimposition thereon of the positive dash counter pulse can produce no further effect than opening the gate. The termination of the positive dash counter pulse is of no further effect on the gate as the corresponding dash return pulse in the train 162 is of a longer duration.

As another example of a possible malfunctioning upon initial application of power, consider the situation where the space counter 188 is initially set improperly, so that its 0 terminal is at its lower potential to close the AND gate 349 and thereby block transmission of a tone to the earphones, while its 1 terminal is at its higher potential, so that the actuator coil 607 is energized. It is true that if such energization were continued for a sufficiently long period the thermal relay 624 would become effective to deenergize the stepping switch; this may be disregarded for the time being. Assuming again that the character counter were properly preset to the count 0 as in the case of the previous example, by a similar line of reasoning it is seen that the unusual state of the space counter would continue indefinitely. The disengagement of the cam contact 611 at the time B would not deenergize the actuator coil 607, so that the stepping switch would remain in its OFF-position and no tone would ever be transmitted.

Although the time delay relay 624 would eventually advance the stepping switch, it is advisable to provide more rapidly responsive means and thereby minimize the instances of operation of the thermal time delay relay. To this end the wiper **256*b* of the sixth wafer 196 of the stepping switch 102 is tied over an interconnection 2206 to the R terminal of the space counter 188, in addition to being tied over interconnection 2202 to the cathode of the diode 260 usually to block the multivibrator square wave generation, as previously explained. Therefore in the OFF-position of the stepping switch —28 volts is routed through the rotatable contact 256, slip ring 256*a*, wiper 256*b* and interconnection 2206 to the R terminal of the space counter 188 to assure that it is properly preset to its usual condition. The OR gate 616 remains open and the actuator coil 607 remains deenergized until engagement of the cam contact 611. The space counter is otherwise inherently reset in view of the generation of two negative pulses at the negative B terminal of the space trigger 175** for each generated long space.

The apparatus has been described so far for the VOR, ILS, DME, MARK (marker or beacon) operation. In the case of the low frequency AN range operation it is necessary to generate two complete sequences in succession prior to any prolonged time interval of silence. The call letter transmission in AN range operation is described in greater detail in Patent No. 2,494,508, granted to R. C. Dehmel on January 10, 1950. As stated therein, the letters "A" and "N" are transmitted to their respective quadrants concurrently. In the simulator the volume of the A and N transmission is controlled by the instructor in accordance with the supposed location of the simulated flight with reference to an on-course beam, at which beam the said letters A and N are received by the student pilot with equal intensity and therefore are heard as a continuous tone. Upon termination of the 30 second period of transmission of A's and N's, a silence period of 0.1 second in the N quadrant and of 3.75 seconds in the A quadrant ensues. Subsequent to the 0.1 second interval of silence a sequence of station identification signals is transmitted to the N quadrants and at the intensity corresponding to the supposed location of the simulated flight, whereafter the N quadrants remain silent until 7.5 seconds subsequent to the termination of transmission of the A's and N's. Upon the termination of the transmission of the station identification sequence to the N sector, and more particularly after the 3.75 seconds time interval of silence in the A quadrants, such silence is continued for 0.1 second therein, whereafter a sequence of identification letters is transmitted to the A quadrants and at the intensity corresponding to the supposed location of the simulated flight. Thereafter a time interval of silence in the A sector follows which terminates at a time 7.5 seconds subsequent to the termination of the transmission of the A's and N's, whence the cycle of A and N transmission and identification signal transmission is repeated. The keyer includes means for generating the aforesaid effects including means described immediately hereinafter for generating two sequences of station identification call-letters in succession.

Referring to Fig. 2, the previously referred to relay 372 had been assumed to be permanently energized in the case of other than AN range transmission to transmit to the final output line 378 an audio tone which is keyed according to the station identification signals according to the energization and deenergization periods of the final output relay 370. In the case of AN range operation, the relay 372 is also energized during the 30 second transmission of A's and N's and thereafter continues to be energized for the duration of transmission of the station-identification signal to the N quadrants. Thereafter the relay 372 is deenergized to transmit over its NC contact 1 an audio tone at the selected volume applicable to the A quadrants derived from a similar oscillator 958. The representation of two oscillators 121 and 958 is for convenience in illustration; generally a single oscillator is employed and the N volume and A volume are changed simultaneously and continuously in accordance with the supposed instantaneous location of the simulated aircraft, as described in the aforesaid Patent 2,494,508.

The previously-referred-to relay 376 whose movable contact 1 is connected to the final output line 378 leading to the student pilot's earphones, had been assumed to be permanently deenergized in the case of transmission other than AN transmission. During the 30 seconds interval of transmission of A's and N's the relay is energized, whence the A and N range signals are fed to the keyer through the terminal AN and thence to the final output line 378 through the NO contact 1 of relay 376. The relays 372 and 376 are energized and deenergized by means external of the keyer which are controlled by synchronization means effective to properly time the energization and deenergization. Such means form no part of the present invention and therefore are not shown.

In the case of AN range operation the cam 609 is not operated. During the 30 second transmission of the A and N range signals the relays 372 and 376 are as stated both energized. A's and N's are transmitted to the final output line 378 over the NO contact 1 of the relay 376 as aforestated and the keyer apparatus is in its usual quiescent state so that the output relay 370 is likewise deenergized. The audio tone signal derived from the oscillator 121 over the NO contact 1 of relay 372 finds an open circuit at the NO contact 2 of the output relay 370. With the relays 372 and 376 both energized a pair of like capacitors 960 and 962 are charging to +250 volts through a pair of like resistors 964 and 966 respectively, whose one ends are respectively connected to plates of the capacitors over the NO contacts 2 of the relays 372 and 376. The other ends of the resistors 964 and 966 are connected to +250 volts. The other plates of the capacitors 960 and 962 and grounded.

At the termination of the 30 second transmission of A's and N's the relay 376 is deenergized. Further transmission of the A's and N's is precluded due to the opening of its NO contact 1, and transmission of the station-identification letters is enabled due to the closure of its NC contact 1. The high potential of capacitor 960 is transmitted through the NC contact 2 of the relay 376 to a junction point 968, thence through a level dropping resistor 970 to the anode of diode 618 to open the OR gate 616, whereby the actuator coil 607 is energized. The capacitor 960 discharges through a resistor 972 connected from junction point 968 to ground. After a short time interval the potential at point 968 is sufficiently low to close the gate once more. Actuator coil 102 is deenergized, the commutator 102 advances to its letter count 1 position, and, after the capacitor 273 has charged up sufficiently, transmission of the sequence commences just as at the time 0. If desired, the dual resistors 268 and 270 may be adjusted to decrease the multivibrator timing period and therefore initiate the sequence after a shorter time delay subsequent to the disconnection of the −28 volt inhibiting voltage. The shorter time delay may be selected with reference to the known release time of relay 376, the known discharge time of capacitor 960, the known pick-up and release times of relay 376 and actuator coil 607 to result in a cumulative time delay of 0.1 second from the termination of the 30 second time interval to the transmission of the initial intelligence character in the sequence. Thereafter the capacitor 960 discharges completely. The sequence is terminated with the reassumption by the stepping switch 102 of its off-position and the reapplication of the −28 volt inhibiting voltage to the multivibrator. Thereafter silence ensues until at 3.75 seconds after the termination of the 30 second time interval the relay 372 likewise releases. The capacitor 962 is connected through the NC contact 2 of relay 372 also to the junction point 968, reopening the OR gate 616 and reenergizing the actuator coil 607. After a short time interval the capacitor discharges sufficiently to reclose the gate, deenergizing the actuator coil and advancing the commutator 102 to its letter count 1 position. In similar manner after 0.1 second subsequent to the release of relay 372 another sequence of call letters is initiated.

With the deenergization of the relay 372, the audio tone, with which the identification signal is now keyed, is derived from the A volume oscillator 958 over the NC contact 1 of relay 372 instead of from the N volume oscillator 121 over the NO contact 1 of relay 372. As a result the station-identification signal is now delivered to the final output line 378 with the selected A volume intensity. The sequence terminates in the manner previously described. Thereafter a silence interval ensues until 7.5 seconds subsequent to the termination of the initial transmission of the A's and N's. At this time the relays 372 and 376 are energized once more, so that the A's and N's are transmitted from the AN terminal over the NO contact 1 of relay 376 to the final output line 378. The capacitors 960 and 962 charge to +250 volts once more and the operation thereafter is repeated cyclically with the repeated deenergization of the relay 376 and thereafter of relay 372.

It should be understood that the invention is not limited to the illustrative example herein described, reference being made to the appended claims rather than the aforegoing specification to determine the scope of the invention.

What is claimed is:

1. In an electronic keyer for keying a signal generator for transmission of a Morse code sequence of station-identification letters, said letters being composed of dot and dash intelligence characters and long and short space characters, said keyer including an encoder which in turn includes a plurality of multi-wafer-multi-position switches each settable for selection of the letters of the alphabet, each position corresponding to a letter, each of the several wafers of each switch having one contact for each letter, those contacts of each switch which correspond to the same letter constituting a group, the contacts of each group encoding characters of the corresponding letter, at least some of said groups including a long space character encoding contact; a long space output circuit connected to switch contacts encoding a long space; and character counter means providing at a plurality of outputs thereof sequentially pulses which signify the count of characters of a selected letter: the combination comprising a rotary stepping switch having a plurality of decks respectively associated with all like-numbered ones of said wafers and with the like-numbered one of said character counter outputs, each of said decks including a plurality of output circuit terminals arranged in a closed ring and in at least one group of consecutive ones thereof, at least some of the output circuit terminals consecutive to one another in a given group being respectively connected to like-numbered output circuit terminals of the remaining groups of the same deck and also being respectively connected to and respectively associated with the individual wafers associated with said same deck, each of said decks including an input circuit terminal switchable from connection to one of its output circuit terminals to the next one in rotary sequence and permanently connected to the character counter output associated with such deck, and means responsive to arrival of a long space count pulse at said long space output circuit including means for effecting the last-mentioned switching of all said input circuit terminals in unison.

2. Apparatus as specified in claim 1 wherein the keyer includes pulse generating means for delivering a pulse train which includes alternately an intelligence character pulse and a short space pulse, and a second and a third means responsive to arrival of a long space count pulse at the long space output circuit for performing respectively the functions of inserting into said delivered pulse train a pulse bridging two consecutive short space pulses thereby to generate the required long spaces to effect delivery to the signal generator of the required sequence, and of resetting the character counter to readiness for generation of another sequence of character count pulses, characterized by the connection to said long space output circuit also of encoder switch contacts encoding the last intelligence character of a letter and by the inclusion of coincidence circuit means common to the three long space pulse arrival responsive means, said coincidence circuit means being respnsive to coincidence of such arrival and a predetermined pulse state of said pulse generating means for delivering to said three means a pulse effective to cause performance of their respective functions.

3. Apparatus as specified in claim 2 wherein the number of wafers per encoder switch and the number of associated character counter outputs is four and wherein the character counter is provided with a fifth output for directly delivering to the long space output circuit the long space count pulse in the case of letters composed of the full four intelligence characters, characterized by the connection to the long space output circuit of contacts of only the first three wafers of an encoder switch and by the additional direct connection to said long space output circuit of the fourth character counter output in addition to its connection to the fourth stepping switch deck input circuit terminal, whereby the aforesaid coincidence circuit means is rendered responsive in the case of letters composed of three and four intelligence characters.

4. Apparatus as specified in claim 1 wherein the keyer includes pulse generating means for delivering a pulse train which includes alternately an intelligence character pulse and a short space pulse, a second and a third means responsive to arrival of a long space output circuit for performing respectively the functions of inserting into said delivered pulse train a pulse bridging two consecutive short space pulses thereby to generate the required long spaces to effect delivery to the signal generator of the required sequence, and of resetting the character counter to readiness for generation of another sequence of character count pulses, means usually disabling said pulse generating means thereby to preclude transmission of a sequence, and starting means for periodically deactivating said disabling means to release said pulse generating means and to permit generation of a sequence, characterized by the provision in each group of stepping switch output circuit terminals of an initial output circuit terminal preceding in sequence the output circuit terminals of such group respectively associated with individual encoder switch wafers, said disabling means being responsive to connection of the stepping switch deck input circuit terminals to respective ones of said initial output circuit terminals, and means responsive to said starting means for switching said input circuit terminals from connection to said respective initial output circuit terminals to connection to the respective first ones of said individually associated output circuit terminals in unison.

5. Apparatus as specified in claim 4 wherein the first long space count pulse arrival responsive switching means and the starting means responsive switching means include, respectively, as individual elements second and third pulse generators, and as common elements an actuator coil for the stepping switch, said actuator coil having usual and alternate states of energization and adapted to effect the aforesaid switching operations of the stepping switch input circuit terminals in unison upon termination of said alternate state of energization, and OR circuit means having inputs connected to said second and third pulse generators for producing an output pulse responsive to an input pulse thereto effective temporarily to change the state of energization from said usual state to said alternate state.

6. Apparatus as specified in claim 5 wherein the initial output circuit terminals of the stepping switch deck associated with the character count one are connected together and with the provision of means connecting an initial output circuit terminal of the last mentioned deck to the aforesaid actuator coil in its usual state of energization, whereby DME operation may be represented.

7. Apparatus as specified in claim 5 wherein the keyer includes means for restarting a second sequence at a predetermined short time interval subsequent to termination of one sequence, characterized by the provision of a fourth pulse generator means responsive to said restarting means and connected to an input of the aforesaid OR circuit means, the aforesaid starting means being effective to reinitiate cyclically said one sequence at a predetermined long time interval subsequent to commencement of the previous said one sequence, whereby AN operation is represented.

8. Apparatus as specified in claim 5 wherein the usual state of the actuator coil is that of deenergization and its alternate state is that of energization, with the addition of a protective circuit for said actuator coil comprising timing circuitry responsive to prolonged energization of said actuator coil for deenergizing the same.

9. Apparatus as specified in claim 1 wherein the keyer includes pulse generating means for delivering a pulse train which includes alternately an intelligence character pulse and a short space pulse, a second and a third means responsive to arrival of a long space count pulse at the long space output circuit for performing respectively the functions of inserting into said delivered pulse train a pulse bridging two consecutive short space pulses thereby to generate the required long spaces to effect delivery to the signal generator of the required sequence, and of resetting the character counter to readiness for generation of another sequence of character count pulses, and starting means, characterized by the provision in each group of stepping switch output circuit terminals of an initial output circuit terminal preceding in sequence the output circuit terminals of such group respectively associated with individual switch wafers, and by the provision of said stepping switch with an additional deck similar to the aforesaid decks, the input circuit terminal of said additional deck being connected to the aforesaid first pulse generating means and its initial output terminals being energized by a potential effective, upon connection of the input circuit terminal of said additional deck to an initial output terminal thereof, to inhibit said pulse generating means to preclude generation of a letter sequence, and means responsive to said starting means for periodically switching in unison all said input circuit terminals from connection to respective initial output terminals to connection to respective next consecutive first ones of said individually associated output terminals thereby to disconnect said inhibiting potential and initiate generation of another letter sequence.

10. Apparatus as specified in claim 9 wherein the first long space count pulse arrival responsive switching means and the starting means responsive switching means include as common elements an actuator coil for the stepping switch, said actuator coil having usual and alternate states of energization and adapted to effect the aforesaid switching operations of the stepping switch input circuit terminals in unison upon termination of said alternate state of energization, and OR circuit means responsive to the herein first-mentioned two switching means for producing an output pulse effective temporarily to change the state of energization from said usual state to said alternate state.

11. Apparatus as specified in claim 10 wherein the wafers include an excess of unused output circuit terminals not per se constituting a useful group, characterized by the connection of said unused output circuit terminals of the aforesaid additional deck to the aforesaid inhibiting potential and by the provision of a second additional stepping switch deck also similar to the aforesaid decks, means connecting the input circuit terminal of said second additional deck to an input of the aforesaid OR circuit means when the aforesaid actuator coil is in its usual state of energization, and means for applying to the unused output circuit terminals of said second additional deck a fixed potential, whereby said stepping switch is caused to home in from the last of the used output circuit terminals to the initial output circuit terminals of the next following group.

12. Apparatus as specified in claim 10 wherein the number of individually associated output circuit terminals in a stepping switch deck group is equal to the maximum number of letters intended to be transmitted, characterized by the provision of means for generating letter sequences of less than said maximum number, comprising a second additional deck included in said stepping switch also similar to the aforesaid decks, means for applying to such of the output terminals in each group of said second additional deck as follow the output circuit terminals associated with the last letter intended to be transmitted, a fixed potential and for simultaneously applying to the corresponding output circuit terminals of the aforesaid additional deck the aforesaid inhibiting potential, and means providing a connection from the input circuit terminal of said second additional deck to an input of the aforesaid OR circuit when the actuator coil is placed in its usual state of energization, whereby said stepping switch is caused to home in from the last of the desired output circuit terminals of one group to the initial output circuit terminals of the next following group.

13. In an electronic keyer for keying a signal generator for transmission of a Morse code sequence of station-identification call-letters, said letters being composed of dot and dash intelligence characters and long and short space characters, said keyer including square wave generating means for producing alternately a dot pulse and a short space pulse; a plurality of multi-wafer-multi-position switches each settable for selection of the letters of the alphabet, each position corresponding to a letter, each of the several wafers of each switch having one contact for each letter, those contact of each switch which correspond to the same letter constituting a group, the contacts of each group encoding characters of the corresponding letter, at least some of said groups including a long space character encoding contact; a dash output circuit connected to switch contacts encoding a required dash and a long space output circuit connected to switch contacts encoding a long space; character counter means providing at a plurality of outputs thereof sequentially pulses which signify the count of characters of a selected letter; and commutator means connecting said counter outputs respectively to the contacts of a selected group of one switch: the combination comprising coincidence circuit means having a first input connected to said square wave generating means and a second input to said dash output circuit for producing responsive to arrival at said second input of a dash count pulse a pair of spaced pulses; a binary dash counter responsive to said pair of spaced pulses for generating a single dash counter pulse, dash inserting pulse mixing means for bridging two consecutive delivered dot pulses with the thereto corresponding single dash counter pulse thereby to produce at at least one output thereof a pulse train including the required dashes, an output of said dash inserting pulse mixing means being connected to said character counter to effect advance of the latter; long space inserting pulse mixing means having an input connected to an output of said dash inserting pulse mixing means and having an output connected to said signal generator; and first, second, and third means each responsive to arrival of a long space count pulse at said long space output circuit, said first arrival responsive means including means for delivering to said long space pulse mixing means a pulse bridging two consecutive short space pulses thereby to effect transmission of a long space to said signal generator, said second arrival responsive means including means for resetting said character counter means to readiness for the sequence of counts for the following letter, and said third arrival responsive means including means for advancing said commutator means to connect the outputs of said character counter means respectively to the contacts of the set of said following letter.

14. Apparatus as specified in claim 13 with the inclusion of means for feeding back the binary dash counter output to the aforesaid second input to preclude transmission of a continous signal by the signal generator.

15. Apparatus as specified in claim 13 with the inclusion of in the coincidence circuit means of means for suppressing the effect on the binary dash counter of a false third pulse produced responsive to arrival at the aforesaid second input of a dash count pulse.

16. Apparatus as specified in claim 15 wherein the suppressing means includes charging circuitry responsive relatively slowly to commencement of the coincidence and relatively rapidly discharging circuitry responsive to termination of the coincidence whereby to form the desired pair of pulses to at least a minimum amplitude and the undesired third false pulse to less than said minimum amplitude, and a trigger circuit responsive to said desired pair of formed pulses and nonresponsive to the third formed pulse for in turn delivering to the binary dash counter a pair of pulses to effect generation of the aforesaid single dash counter pulse.

17. An electronic keyer for keying a signal generator for transmission of a Morse code sequence of station-identification call-letters, said letters being composed of dot and dash intelligence characters and long and short space characters, said keyer including a first pulse generator for delivering alternately an intelligence character pulse and a short space character pulse; long space inserting pulse mixing means having an input connected to an output of said first pulse generator means and having an output connected to said signal generator; a plurality of multi-wafer-multi-position switches each settable for selection of the letters of the alphabet, each position corresponding to a letter, each of the several wafers of each switch having one contact for each letter, those contacts of each switch which correspond to the same letter constituting a group, the contacts of each group encoding characters of the corresponding letter, at least some of said groups including a long space character encoding contact; a long space output circuit connected to switch contacts encoding a long space; character counter means advanceable responsive to an output of said first pulse generator means and providing at a plurality of outputs thereof sequentially pulses which signify the count of characters of a selected letter; and commutator means connecting said counter outputs respectively to the contacts of a selected group of one switch; characterized by the connection to said long space output circuit also of switch contacts encoding the last intelligence characters of letters; and by the provision of coincidence circuit means having a first input connected to an output of said first pulse generator means and a second input to said long space output circuit for producing responsive to arrival of a pulse at said second input a pair of spaced pulses; a binary space counter responsive to said pair of spaced pulses for generating a single space counter pulse; and first, second and third means each responsive to said single space counter pulses, said first space counter pulse responsive means including means for delivering to said long space pulse mixing means a pulse bridging two consecutive short space pulses thereby to effect transmission of a long space to said signal generator, said second space counter pulse responsive means including means for resetting said character counter means to readiness for the sequence of counts for the following letter, and said third space counter pulse responsive means including means for advancing said commutator means to connect the outputs of said character counter means respectively to the contacts of the set of said following letter.

18. Apparatus as specified in claim 17 with the provision of means for presetting the binary space counter thereby to preclude blocking of the operation of said apparatus.

19. Apparatus as specified in claim 17 wherein a pulse arriving at the aforesaid second input is delayed with reference to the thereto corresponding two intelligence character pulses thereby to assure termination of the second in the aforesaid pair of pulses.

20. Apparatus as specified in claim 19 wherein the delay is the inherent delay in transmission from the first pulse generator means through the character counter means and through the long space output circuit to the aforesaid second input of the coincidence circuit means.

No references cited.